(12) United States Patent
Kim

(10) Patent No.: US 11,627,316 B2
(45) Date of Patent: *Apr. 11, 2023

(54) ENCODING AND DECODING APPARATUSES INCLUDING CNN-BASED IN-LOOP FILTER

(71) Applicant: KOREA ADVANCED INSTITUTE OF SCIENCE AND TECHNOLOGY, Daejeon (KR)

(72) Inventor: Mun Churl Kim, Daejeon (KR)

(73) Assignee: KOREA ADVANCED INSTITUTE OF SCIENCE AND TECHNOLOGY, Daejeon (KR)

(*) Notice: Subject to any disclaimer, the term of this patent is extended or adjusted under 35 U.S.C. 154(b) by 0 days.

This patent is subject to a terminal disclaimer.

(21) Appl. No.: 17/376,162

(22) Filed: Jul. 15, 2021

(65) Prior Publication Data

US 2021/0344916 A1    Nov. 4, 2021

Related U.S. Application Data

(63) Continuation of application No. 16/313,052, filed as application No. PCT/KR2017/001512 on Feb. 13, 2017, now Pat. No. 11,095,887.

(30) Foreign Application Priority Data

Jun. 24, 2016  (KR) .................. 10-2016-0079240
Feb. 9, 2017   (KR) .................. 10-2017-0017959

(51) Int. Cl.
*H04N 11/02* (2006.01)
*H04N 19/117* (2014.01)
(Continued)

(52) U.S. Cl.
CPC ........... *H04N 19/117* (2014.11); *G06F 17/15* (2013.01); *G06N 3/04* (2013.01); *H04N 19/124* (2014.11); *H04N 19/176* (2014.11); *H04N 19/82* (2014.11)

(58) Field of Classification Search
CPC .................................................. H04N 19/117
(Continued)

(56) References Cited

U.S. PATENT DOCUMENTS 5,461,699 A * 10/1995 Arbabi ............... G06N 3/04
706/21
5,825,646 A * 10/1998 Keeler ............... G05B 13/0285
700/48

(Continued)

*Primary Examiner* — Leron Beck
(74) *Attorney, Agent, or Firm* — JCIPRNET

(57) ABSTRACT

Disclosed according to one exemplary embodiment includes not limited to: a filtering unit configured to generate filtering information by filtering a residual image corresponding to a difference between an original image and a prediction image; an inverse filtering unit configured to generate inverse filtering information by inversely filtering the filtering information; an estimator configured to generate the prediction image based on the original image and reconstruction information; a CNN-based in-loop filter configured to receive the inverse filtering information and the prediction image and to output the reconstruction information; and an encoder configured to perform encoding based on the filtering information and information of the prediction image, and wherein the CNN-based in-loop filter is trained for each of the plurality of artefact sections according to an artefact value or for each of the plurality of quantization parameter sections according to a quantization parameter.

20 Claims, 19 Drawing Sheets

(51) Int. Cl.
*H04N 19/82* (2014.01)
*G06F 17/15* (2006.01)
*H04N 19/176* (2014.01)
*G06N 3/04* (2023.01)
*H04N 19/124* (2014.01)

(58) Field of Classification Search
USPC .................................. 375/240.01–240.29
See application file for complete search history.

(56) References Cited

U.S. PATENT DOCUMENTS

| | | | | |
|---|---|---|---|---|
| 9,015,093 | B1* | 4/2015 | Commons | B60W 30/00 |
| | | | | 706/26 |
| 9,357,223 | B2* | 5/2016 | Xu | H04N 19/436 |
| 9,479,786 | B2* | 10/2016 | Lu | H04N 19/127 |
| 10,419,764 | B2* | 9/2019 | Park | H04N 19/182 |
| 2009/0034622 | A1* | 2/2009 | Huchet | H04N 19/182 |
| | | | | 375/E7.193 |
| 2009/0110070 | A1* | 4/2009 | Takahashi | H04N 19/60 |
| | | | | 375/E7.243 |
| 2010/0128803 | A1* | 5/2010 | Divorra Escoda | H04N 19/154 |
| | | | | 375/E7.194 |
| 2011/0228843 | A1* | 9/2011 | Narroschke | H04N 19/80 |
| | | | | 375/E7.193 |
| 2012/0320973 | A1* | 12/2012 | Xu | H04N 19/117 |
| | | | | 375/240.03 |
| 2014/0023136 | A1* | 1/2014 | Park | H04N 19/176 |
| | | | | 375/240.12 |
| 2016/0148078 | A1* | 5/2016 | Shen | G06V 30/194 |
| | | | | 382/158 |
| 2018/0075581 | A1* | 3/2018 | Shi | G06T 3/4046 |

\* cited by examiner

ENCODING AND DECODING APPARATUSES INCLUDING CNN-BASED IN-LOOP FILTER

CROSS REFERENCE TO RELATED APPLICATIONS

This application is a continuation application of the U.S. patent application Ser. No. 16/313,052, filed on Feb. 25, 2019, which is a 371 application of the International PCT application serial no. PCT/KR2017/001512, filed on Feb. 13, 2017, which claims the priority benefits of Korean application serial no. 10-2016-0079240, filed on Jun. 24, 2016 and Korean application serial no. 10-2017-0017959, filed on Feb. 9, 2017. The entirety of each of the above-mentioned patent applications is hereby incorporated by reference herein and made a part of this specification.

TECHNICAL FIELD

The following example embodiments relate to an encoding apparatus and a decoding apparatus each including a convolutional neural network (CNN)-based in-loop filter.

RELATED ART

In the related art, in order to mitigate the visual disturbance of a block boundary caused by a difference between pixel values of adjacent encoding blocks by quantization, in-loop filtering is applied along the block boundaries between adjacent encoding blocks as a method of reducing a difference between pixels by considering a block encoding type along a block boundary, pixel intensity values across the block boundaries, motion information, and information on presence or absence of a residual signal after quantization etc. Here, although a coefficient is not transmitted since a fixed filter coefficient is used, in-loop filtering may be effective only in terms of reducing a blocky artifact occurring along the encoding block boundaries.

Currently, a high efficiency video coding (HEVC) standard applies de-blocking filtering along encoding block boundaries and additionally applies, as secondary in-loop filtering, sample adaptive offset (SAO) filtering for reducing a brightness difference artifact and a ringing artefact occurring in perpendicular to image object edges due to quantization. In this case, a high frequency blurring artefact may not be improved properly and the transmission of a sample offset and an edge direction type to a decoder limits the improvement in coding efficiency.

SUMMARY OF THE DISCLOSURE

Subject

Example embodiments may provide technology for removing a block boundary artefact, a ringing artefact, and a high frequency blurring artefact occurring due to quantization through in-loop filtering.

Also, example embodiments may provide technology for enhancing an image quality without transmitting an in-loop filter coefficient to an encoding apparatus and a decoding apparatus using a trained convolutional neural network (CNN)-based in-loop filter.

Also, example embodiments may provide technology for an encoding apparatus and a decoding apparatus to significantly enhancing an encoding efficiency or a decoding efficiency by using an image quality enhanced frame as a reference frame using a trained CNN-based in-loop filter.

Also, example embodiments may provide technology for applying in-loop filtering for each slice type.

Also, example embodiments may provide technology for applying in-loop filtering for each encoding block.

Also, example embodiments may provide technology for applying in-loop filtering for each region of a designated image.

Solution

According to an exemplary embodiment, the disclosure provides an encoding apparatus which includes not limited to a filtering unit configured to generate filtering information by filtering a residual image corresponding to a difference between an original image and a prediction image; an inverse filtering unit configured to generate inverse filtering information by inversely filtering the filtering information; an estimator configured to generate the prediction image based on the original image and reconstruction information; a convolutional neural network (CNN)-based in-loop filter configured to receive the inverse filtering information and the prediction image and to output the reconstruction information; and an encoder configured to perform encoding based on the filtering information and information of the prediction image, and wherein the CNN-based in-loop filter is trained for each of the plurality of artefact sections according to an artefact value or for each of the plurality of quantization parameter sections according to a quantization parameter.

According to an exemplary embodiment, the filtering unit could be configured to generate filtering information by transforming and quantizing the residual image, and the inverse filtering unit could be configured to generate inverse filtering information by performing inverse quantization and inverse transformation on the filtering information.

According to an exemplary embodiment, the reconstruction information could be in the same format as that of the original image, and he CNN-based in-loop filter could be configured to generate reconstruction information by inputting the inverse filtering information and prediction information based on the prediction image to the CNN-based in-loop filter.

According to an exemplary embodiment, the encoding apparatus may further include an in-loop filter configured to perform in-loop filtering on the prediction information.

According to an exemplary embodiment, the in-loop filter may include at least one of a deblocking filter, a sample adaptive offset filter, and an adaptive loop filter.

According to an exemplary embodiment, the encoding apparatus may further include an in-loop filter configured to perform in-loop filtering on the reconstruction information.

According to an exemplary embodiment, the disclosure provides a decoding apparatus which include not limited to an entropy decoder configured to output filtering information and preliminary prediction information by decoding encoded bitstream information; an inverse filtering unit configured to generate inverse filtering information by inversely filtering the filtering information; an estimator configured to generate a prediction image based on the preliminary prediction information; and a convolutional neural network (CNN)-based in-loop filter configured to receive the inverse filtering information and the prediction image and to output reconstruction information, and wherein the CNN-based in-loop filter is trained for each of the plurality of artefact sections according to an artefact value or for each of the plurality of quantization parameter sections according to a quantization parameter.

According to an exemplary embodiment, the reconstruction information could be in the same format as that of the original image, and the CNN-based in-loop filter is configured to generate reconstruction information by inputting the inverse filtering information and prediction information based on the prediction image to the CNN-based in-loop filter.

According to an exemplary embodiment, the decoding apparatus may further include an in-loop filter configured to perform in-loop filtering on the inverse filtering information.

According to an exemplary embodiment, the in-loop filter may include at least one of a deblocking filter, a sampled adaptive offset filter, and an adaptive loop filter.

According to an exemplary embodiment, the reconstruction information could be in the same format as that of the residual image, and the CNN-based in-loop filter could be configured to generate reconstruction information by inputting the inverse filtering information and prediction information based on the prediction image to the CNN-based in-loop filter.

According to an exemplary embodiment, the decoding apparatus may further include an adder configured to generate final reconstruction information by adding the reconstruction information and the prediction image.

According to an exemplary embodiment, the decoding apparatus may further include an adder configured to generate final reconstruction information by adding the residual reconstruction information and the prediction image.

According to an exemplary embodiment, the decoding apparatus may further include an in-loop filter configured to perform in-loop filtering on the final reconstruction information.

According to an exemplary embodiment, the in-loop filter may include at least one of a deblocking filter, a sample adaptive offset filter, and an adaptive loop filter.

In order to make the aforementioned features and advantages of the present disclosure comprehensible, exemplary embodiments accompanied with figures are described in detail below. It is to be understood that both the foregoing general description and the following detailed description are exemplary, and are intended to provide further explanation of the disclosure as claimed.

It should be understood, however, that this summary may not contain all of the aspect and embodiments of the present disclosure and is therefore not meant to be limiting or restrictive in any manner. Also the present disclosure would include improvements and modifications which are obvious to one skilled in the art.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DETAILED DESCRIPTION OF DISCLOSED EMBODIMENTS

Best Mode

Figure 1:
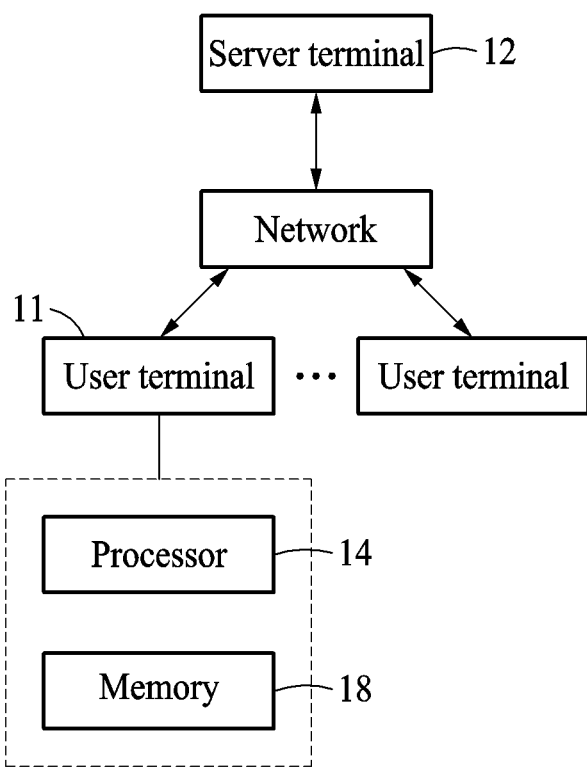
FIG. 1 illustrates an example of a system using an encoding apparatus and/or a decoding apparatus.

The structural or functional descriptions related to example embodiments according to the concept of the present disclosure disclosed herein are provided to describe the example embodiments. Accordingly, the example embodiments according to the concept of the present disclosure may be implemented in various forms and are not limited to example embodiments described herein.

Various modifications and implementations may be made to the example embodiments according to the concept of the present disclosure. Accordingly, the example embodiments are illustrated in the accompanying drawings and are described in detail herein. However, the example embodiments according to the concept of the present disclosure are not construed to limit specific implementations and construed to include changes, equivalents, or replacements included in the spirit and technical scope of the present disclosure.

Although terms such as "first" and "second" may be used herein to describe various components, the components are not to be limited by these terms. Rather, these terms are only used to distinguish one component from another component. Thus, a first component may also be referred to as a second component and the second component may be referred to as the first component without departing from the teachings of the example embodiments.

When a component is described as being "on," "connected to," or "coupled to" another component, it may be directly "on," "connected to," or "coupled to" the other component, or there may be one or more other components intervening therebetween. In contrast, when a component is described as being "directly on," "directly connected to," or "directly coupled to" another component, there can be no other elements intervening therebetween. Expressions to describe a relationship between components, for example, "between", "directly between", and "directly adjacent to" should be understood in the same manner.

The terminology used herein is for describing various example embodiments only, and is not to be used to limit the disclosure. The singular form is intended to include the plural forms as well, unless the context clearly indicates otherwise. The terms "comprises/includes" and "has" specify the presence of stated features, numbers, operations, members, elements, and/or combinations thereof, but do not preclude the presence or addition of one or more other features, numbers, operations, members, elements, and/or combinations thereof.

Unless otherwise defined, all terms, including technical and scientific terms, used herein have the same meaning as commonly understood by one of ordinary skill in the art to which this disclosure pertains. Terms, such as those defined in commonly used dictionaries, are to be interpreted as having a meaning that is consistent with their meaning in the context of the relevant art, and are not to be interpreted in an idealized or overly formal sense unless expressly so defined herein.

Hereinafter, the example embodiments are described in detail with reference to the accompanying drawings. However, the scope of the application is not limited thereto or restricted thereby and like reference numerals refer to like elements through although they are illustrated in the different drawings.

FIG. 1 illustrates an example of a system using an encoding apparatus and/or a decoding apparatus.

Referring to FIG. 1, a system 10 using an encoding apparatus and/or decoding apparatus may include a user terminal 11 and a server terminal 12. The user terminal 11 may include an electronic device. The electronic device may include, for example, a personal computer (PC), a data server, a television (TV), and a portable device.

The portable device may include, for example, a laptop computer, a mobile phone, a smartphone, a tablet PC, a mobile internet device (MID), a personal digital assistant (PDA), an enterprise digital assistant (EDA), a digital still camera, a digital video camera, a portable multimedia player (PMP), a playstation portable (PSP), a personal navigation device or a portable navigation device (PND), a handheld game console, a wireless communication terminal, e-book, and a smart device.

The server terminal 12 may include an application server, a service server, and the like.

The user terminal 11 and the server terminal 12 may include various apparatuses including, for example, a communication apparatus, such as a communication modem for communicating with various types of devices or wired/wireless communication networks, a memory 18 configured to store various types of programs and data for encoding or decoding an image and or an inter prediction or an intra prediction for encoding and decoding, and a processor 14 configured to perform an operation and control by executing a program.

Also, the user terminal 11 and the server terminal 12 may transmit an image encoded to a bitstream by the encoding apparatus to an image decoding apparatus. For example, the user terminal 11 and the server terminal 12 may transmit the encoded image to the image decoding apparatus in real time or in non-real time.

The user terminal 11 and the server terminal 12 may transmit the encoded image to the image decoding apparatus through the wired/wireless communication network or various communication interfaces. For example, the wired/wireless communication network may be the Internet, a near field radio communication network, a wireless local area network (WLAN), a wireless broadband Internet (WiBro) network, and a mobile communication network. The communication interface may include, for example, a cable and a universal serial bus (USB).

Also, the image encoded to the bitstream by the encoding apparatus may be transmitted from the encoding apparatus to the decoding apparatus through a non-transitory computer-readable storage medium.

The decoding apparatus may decode the encoded image and may play the decoded image.

The encoding apparatus and the decoding apparatus may be separate apparatuses and may be configured as a single encoding-and-decoding apparatus depending on example embodiments. In the case of the single encoding-and-decoding apparatus, an estimator, an inverse-quantizer, an inverse-transformer, an adder, a filtering unit, and a decoded picture buffer (DPB) of the encoding apparatus may include at least same structure or perform at least same function as the substantially identical technical elements as an estimator, an inverse-quantizer, an inverse-transformer, an adder, a filtering unit, and a DPB of the decoding apparatus, in described sequence. Also, when an entropy encoder may correspond to an entropy decoder when a function of the entropy encoder is inversely performed.

Accordingly, when describing the following technical elements and operational principles thereof, iterative description related to corresponding technical elements is omitted.

Also, since the decoding apparatus corresponds to a computing apparatus that applies an encoding method performed by the encoding apparatus to decoding, the following description is made based on the encoding apparatus. Herein, the encoding apparatus may also be referred to as an encoding device and the decoding apparatus may also be referred to as a decoding device.

Figure 2A:
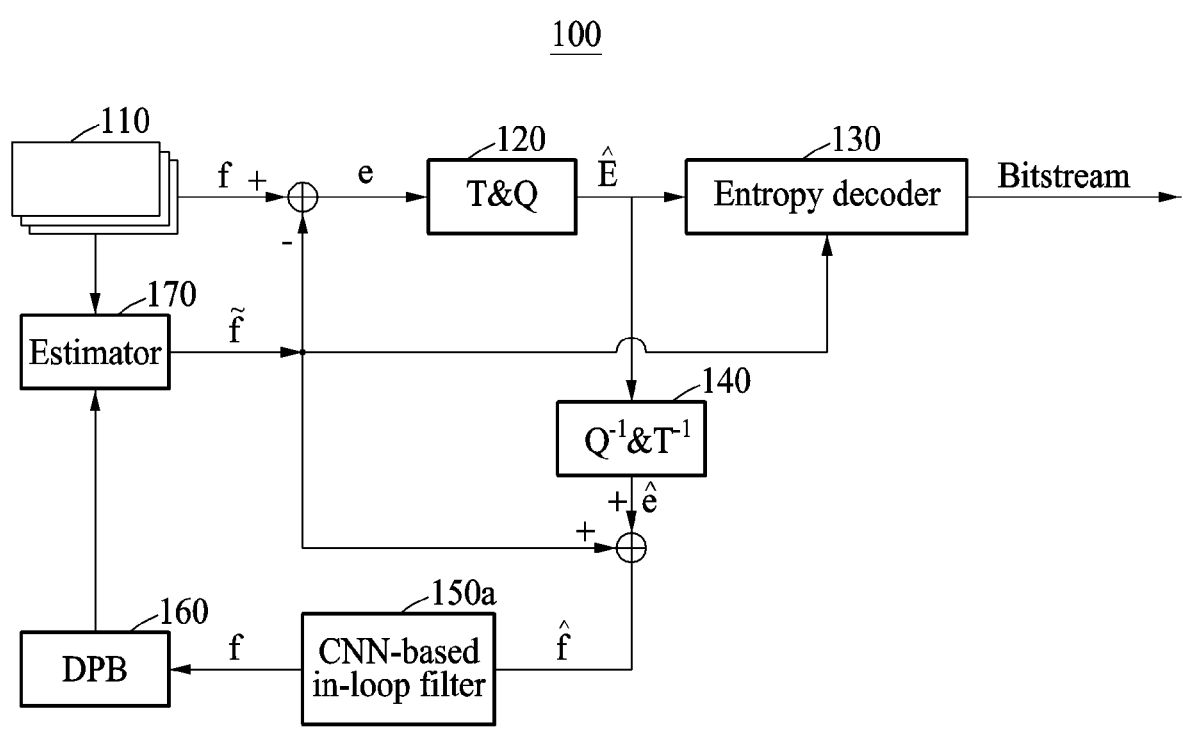
FIG. 2A is a block diagram illustrating an example of an encoding apparatus including a convolutional neural network (CNN)-based in-loop filter according to an example embodiment.
Figure 2B:
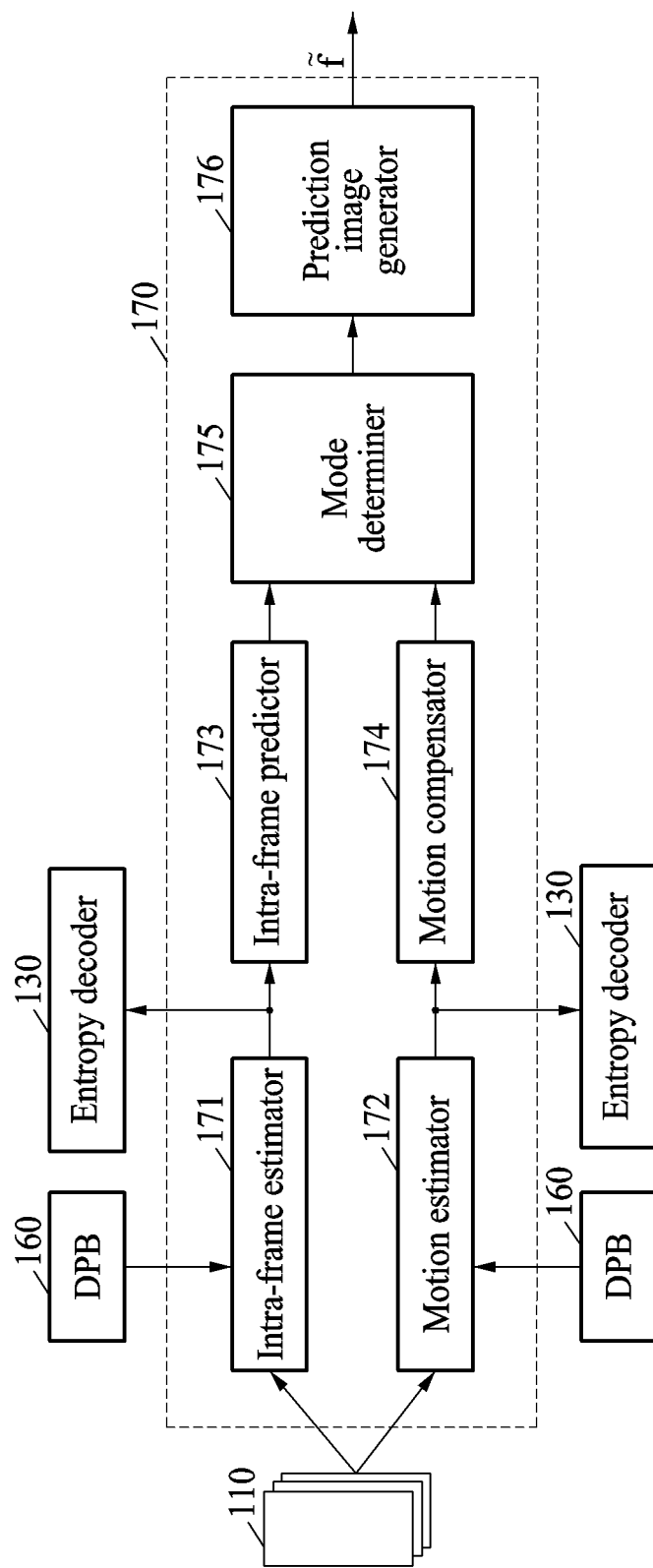
FIG. 2B is a block diagram illustrating an example of an estimator of FIG. 1.

FIG. 2A is a block diagram illustrating an example of an encoding apparatus including a convolutional neural network (CNN)-based in-loop filter according to an example embodiment, and FIG. 2B is a block diagram illustrating an example of an estimator of FIG. 1.

Referring to FIGS. 2A and 2B, an encoding apparatus 100 includes a transformer and quantizer 120, an entropy encoder 130, an inverse-quantizer and inverse-transformer 140, a CNN-based in-loop filter 150a, a decoded picture buffer (DPB) 160, an estimator 170, and a plurality of adders.

The encoding apparatus 100 may perform encoding on an input image 110 or an input slice 110. For example, the encoding apparatus 100 may perform encoding on a plurality of pixel blocks f divided from the input image 110 or the input slice 110. The encoding apparatus 100 may further include a divider (not shown) configured to divide the input image 110 or the input slice 110. The divider (not shown) may divide the input image 110 or the input slice 110 into blocks each with a desired size, for example, M×N. Here, M or N denotes a natural number of 1 or more.

The divider (not shown) may determine the size (M×N) of the block based on a characteristic or a resolution of the input image 110 or the input slice 110. The divider (not shown) may determine the size (M×N) of the block as an involution of 2. The divider (not shown) may determine the size (M×N) of the block based on a square shape or a rectangular shape. For example, when the divider (not shown) determines the size (M×N) of the block based on the square shape, the size (M×N) of the block may be 256×256, 128×128, 64×64, 32×32, 16×16, 8×8, or 4×4.

The adder may generate a residual block e based on the pixel block f and a prediction block $\hat{f}$. For example, the residual block e may be a block corresponding to a difference between the pixel block f and the prediction block $\hat{f}$. The prediction block $\hat{f}$ may be a block that is generated by the estimator 170 by applying an intra prediction or an inter prediction on the pixel block f. The transformer and quantizer 120 may perform transformation and quantization on the residual block e. The transformer and quantizer 120 may enhance an encoding efficiency by performing transformation and quantization on the residual block e, instead of using the pixel block f.

The transformer and quantizer 120 may generate filtering information $\hat{E}$ by performing filtering on the residual block e. For example, the transformer and quantizer 120 may perform transformation and/or quantization on the residual block e.

The transformer and quantizer 120 may transform a domain of the residual block e to a frequency domain. Each pixel of the residual block e may correspond to a transformation coefficient of the transformed residual block.

The transformer and quantizer 120 may transform the residual block e using a transformation matrix. The transformation matrix may be a one-dimensional (1D), two-dimensional (2D), or three-dimensional (3D) transformation matrix. For example, the transformer and quantizer 120 may use the transformation matrix, such as a discrete cosine transform (DCT), a discrete cosine transform (DST), a horizontal unit, and a vertical unit. The transformer and quantizer 120 may determine whether to use the transformation matrix based on a size, a shape, a type (luminance/chrominance), an encoding mode, prediction mode information, and a quantization parameter of the residual block e, encoding information of a neighboring block. The transformer and quantizer 120 may generate a transformation block E by transforming the residual block e.

The transformer and quantizer 120 may perform quantization on the transformation block E and may output a quantized residual $\hat{E}$. The transformer and quantizer 120 may perform quantization on a transformation coefficient of the transformation block E. The transformer and quantizer 120 may perform filtering on the residual image e based on at least one of a quantization section according to a quantization parameter QP, an artefact value section according to a characteristic of an image signal, a texture complexity section according to the characteristic of the image signal, and a motion complexity section according to the characteristic of the image signal. The image signal may include the residual block e.

The transformer and quantizer 120 may perform quantization based on the quantization parameter QP. The transformer and quantizer 120 may determine the quantization parameter based on a block unit of the transformation block E. The quantization parameter may be set based on a unit, for example, a sequence, a picture, a slice, and a block.

The transformer and quantizer 120 may derive at least one quantization parameter from a neighboring block of the transformation block E. The transformer and quantizer 120 may predict a quantization parameter of the transformation block E using the at least one quantization parameter. For example, the transformer and quantizer 120 may derive at least one quantization parameter from the neighboring block present on the left, above the left, below the left, on the right, above the right, below the right, or below the transformation block E. The transformer and quantizer 120 may calculate a differential value between the predicted quantization parameter and the quantization parameter derived from the neighboring block and may transmit the differential value to the entropy encoder 130.

When the transformer and quantizer 120 is incapable of deriving the quantization parameter from the neighboring block of the transformation block E, the transformer and quantizer 120 may set the quantization parameter based on a basic parameter that is transmitted based on a unit, such as a sequence, a picture, a slice, and a block. The transformer and quantizer 120 may calculate a differential value between the basic parameter and the quantization parameter and may transmit the calculated differential value to the entropy encoder 130.

The transformer and quantizer 120 may transmit the quantized residual transformation $\hat{E}$ to the entropy encoder 130 and/or the inverse-quantizer and inverse-transformer 140.

The entropy encoder 130 may perform entropy encoding on the prediction block $\hat{f}$ and/or the quantized residual transformation $\hat{E}$. For example, the entropy encoder 130 may perform entropy encoding using an encoding scheme, such as a context adaptive variable length coding (CAVLC), a context adaptive binary arithmetic coding (CABAC), and a syntax-based context adaptive binary arithmetic coding (SBAC).

The entropy encoder 130 may perform entropy encoding and may output encoded data as a bitstream. The encoded data may include a bitstream encoded from a quantization parameter and a variety of information required to decode the encoded bitstream. Also, the encoded data may include an encoded block form, a quantization parameter, a bitstream in which a quantization block is encoded, and information required for prediction.

The inverse-quantizer and inverse-transformer 140 may generate inverse filtering information $\hat{e}$ by performing inverse filtering on the filtering information $\hat{E}$. The inverse filtering information $\hat{e}$ may indicate a reconstructed residual block $\hat{e}$. For example, the inverse-quantizer and inverse-transformer 140 may generate the reconstructed residual block by performing inverse-quantization and/or inverse-transformation on the quantized residual transformation $\hat{E}$. The inverse-quantizer and inverse-transformer 140 may inversely perform an operation of the transformer and quantizer 120. For example, the inverse-quantizer and inverse-transformer 140 may perform inverse-quantization and inverse-transformation on the quantized residual transformation $\hat{E}$. The inverse-quantizer and inverse-transformer 140 may be configured in a structure opposite to a transformation and quantization structure of the transformer and quantizer 120.

Although FIG. 1 illustrates that the transformer and quantizer 120 performs transformation and quantization for clarity of description, it is provided as an example only. The transformer and quantizer 120 may be separately provided as a transformer configured to transform the residual block e and a quantizer configured to quantize the residual block e.

Also, although FIG. 1 illustrates that the inverse-quantizer and inverse-transformer 140 performs inverse-quantization and inverse-transformation, it is provided as an example only. The inverse-quantizer and inverse transformer 140 may be separately provided as an inverse-quantizer configured to inversely quantize the quantized residual transformation $\hat{E}$ and an inverse-transformer configured to inversely transform the quantized residual transformation $\hat{E}$.

The adder may generate a preliminary reconstruction block $\hat{f}$ based on the prediction block $\bar{f}$ and the reconstructed residual block $\hat{e}$. The preliminary reconstruction block $\hat{f}$ may be a block in which the prediction block $\bar{f}$ and the reconstructed residual block $\hat{e}$ are added.

The CNN-based in-loop filter 150a may generate reconstruction information by performing in-loop filtering on prediction information. The prediction information may be the preliminary reconstruction block $\hat{f}$, a secondary preliminary reconstruction block $\tilde{f}$, or the reconstructed residual block $\hat{e}$. The reconstruction information may be a reconstruction block $\hat{f}$, a secondary reconstructed residual block $\hat{\hat{e}}$ or $\tilde{e}$, a final reconstruction block $\tilde{f}$, and the like. An operation of performing, by the CNN-based in-loop filter 150a, in-loop filtering on the preliminary reconstruction block $\hat{f}$ to generate the reconstruction block $\tilde{f}$ will be described with reference to FIGS. 2A and 2B.

The CNN-based in-loop filter 150a may generate the reconstruction block $\tilde{f}$ by performing in-loop filtering on the secondary prediction block (preliminary reconstruction block $\tilde{f}$). The preliminary reconstruction block $\tilde{f}$ may be a block in which the reconstructed residual block $\hat{e}$ and the prediction block $\bar{f}$ are added. The reconstruction block $\tilde{f}$ may be a block with an enhanced image quality compared to that of the prediction block $\bar{f}$ or the preliminary reconstruction block $\hat{f}$.

The CNN-based in-loop filter 150a may use a deep convolutional neural network (DCC). That is, the CNN-based in-loop filter 150a may be trained based on a plurality of pieces of training data. The CNN-based in-loop filter 150a may be trained to generate an output image appropriate for an input image.

The CNN-based in-loop filter 150a may include an input layer, a hidden layer, and an output layer. Each of the input layer, the hidden layer, and the output layer may include a plurality of nodes.

Nodes between adjacent layers may be connected to each other with a connection weight. Each of the nodes may operate based on an activation model. An output value corresponding to an input value may be determined based on the activation model. An output value of a node may be input to a node of a subsequent layer connected to the corresponding node. The node of the subsequent layer may receive values that are output from the plurality of nodes. During a process in which the output value of the node is input to the node of the subsequent layer, the connection weight may be applied. The node of the subsequent layer may output an output value corresponding to an input value to a node of a subsequent layer connected to the corresponding node of the subsequent layer based on the activation model.

The output layer may include nodes corresponding to in-loop filtering. The nodes of the output layer may output feature values corresponding to an image or a block on which in-loop filtering is performed.

The CNN-based in-loop filter 150a may perform filtering on the preliminary reconstruction block $\hat{f}$ for each slice, for each encoding block, or for each designated region. Accordingly, the encoding apparatus 100 may enhance an encoding efficiency and complexity by encoding the reconstruction block $\tilde{f}$ that is generated as a filtering result.

The CNN-based in-loop filter 150a may generate the reconstruction block $\tilde{f}$ by performing filtering on the preliminary reconstruction block $\hat{f}$. That is, the CNN-based in-loop filter 150a may be trained to generate the reconstruction block $\tilde{f}$ based on the preliminary reconstruction block $\hat{f}$. For example, the CNN-based in-loop filter 150a may be trained to generate the reconstruction block $\tilde{f}$ based on the preliminary reconstruction block $\hat{f}$ and the pixel block f.

The CNN-based in-loop filter 150a may transmit the reconstruction block $\tilde{f}$ to the DPB 160.

A configuration and a training method of the CNN-based in-loop filter 150a will be described with reference to the accompanying drawings.

The DPB 160 may store the reconstruction block $\tilde{f}$ or may output and display the reconstruction block $\tilde{f}$ using a display device.

When the DPB 160 stores the reconstruction block $\tilde{f}$, the DPB 160 may transmit the reconstruction block $\tilde{f}$ to be used for the estimator 170 to generate the prediction block $\bar{f}$. For example, the estimator 170 may generate the prediction block $\bar{f}$ using the reconstruction block $\tilde{f}$ during a subsequent intra prediction or inter prediction process.

The estimator 170 may generate the prediction block $\bar{f}$ based on the pixel block f and the reconstruction block $\tilde{f}$. A time difference may be present between the reconstruction block $\tilde{f}$ and the pixel block f. For example, the reconstruction block $\tilde{f}$ may be a block that is generated before the pixel block f.

The estimator 170 may generate information of the prediction block $\bar{f}$ based on the pixel block f and the reconstruction block $\tilde{f}$. For example, information of the prediction block $\bar{f}$ may include at least one of an intra prediction mode, an inter motion prediction mode, a motion block type, and a motion vector.

The estimator 170 may include an intra-frame estimator 171, a motion estimator 172, an intra-frame predictor 173, a motion compensator 174, a mode determiner 175, and a prediction image generator 176.

The intra-frame estimator 171 and the motion estimator 172 may receive the reconstruction block $\tilde{f}$ from the input image 110 and the DPB 160.

The intra-frame estimator 171 may determine an intra mode based on the input image 110 and the reconstruction block $\tilde{f}$. The intra-frame estimator 171 may transmit the intra mode to the intra-frame predictor 173 and the entropy encoder 130.

The intra-frame predictor 173 may perform an intra prediction based on the input image 110 and the reconstruction block $\hat{f}$ in the intra mode, and may transmit a result value to the mode determiner 175.

The motion estimator 172 may extract motion vectors based on the input image 110 and the reconstruction block $\hat{f}$. The motion estimator 172 may transmit the motion vectors to the motion compensator 174.

The motion compensator 174 may compensate for an intra motion based on the motion vectors of the input image 110 and the reconstruction block $\hat{f}$ and may transmit a result value to the mode determiner 175.

The mode determiner 175 may determine an encoding mode based on data from the intra-frame predictor 173 and the motion compensator 174. For example, the encoding mode may be an intra mode, an inter mode, and the like.

The prediction image generator 176 may generate the prediction block $\hat{f}$ based on the encoding mode determined by the mode determiner 175.

The prediction image generator 176 may transmit the generated prediction block $\hat{f}$ to the adder or the entropy encoder 130.

Figure 3:
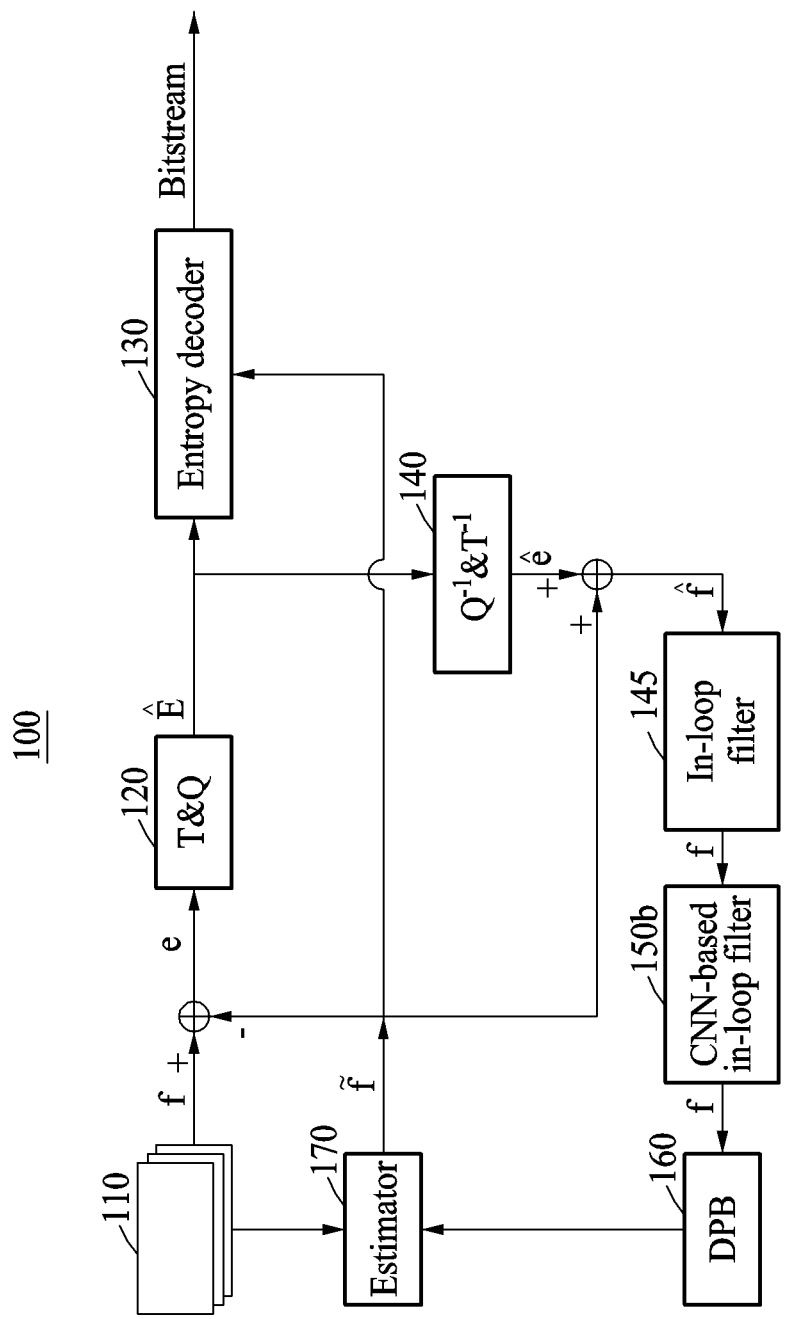
FIG. 3 is a block diagram illustrating another example of an encoding apparatus including a CNN-based in-loop filter according to an example embodiment.

FIG. 3 is a block diagram illustrating another example of an encoding apparatus including a CNN-based in-loop filter according to an example embodiment.

Referring to FIG. 3, the encoding apparatus 100 includes the transformer and quantizer 120, the entropy encoder 130, the inverse-quantizer and inverse-transformer 140, an in-loop filter 145, a CNN-based in-loop filter 150b, the DPB 160, the estimator 170, and the plurality of adders.

Configurations and operations of the transformer and quantizer 120, the entropy encoder 130, the inverse-quantizer and inverse-transformer 140, the DPB 160, the estimator 170, and the plurality of adders of FIG. 3 may be substantially identical to those of the transformer and quantizer 120, the entropy encoder 130, the inverse-quantizer and inverse-transformer 140, the DPB 160, the estimator 170, and the plurality of adders of FIG. 2A. In the following, the in-loop filter 145 and the CNN-based in-loop filter 150b will be described.

The in-loop filter 145 may receive a preliminary reconstruction block $\hat{f}$ from the adder. The in-loop filter 145 may generate a secondary preliminary reconstruction block $\hat{\hat{f}}$ by performing filtering on the preliminary reconstruction block $\hat{f}$.

The in-loop filter 145 may include at least one of a deblocking filter, a sample adaptive offset (SAO) filter, and an adaptive loop filter (ALF).

That is, when the in-loop filter 145 includes a single filter, the in-loop filter 145 may include one of the deblocking filter, the SAO filter, and the adaptive loop filter.

When the in-loop filter 145 includes two filters, the in-loop filter 145 may include the deblocking filter and the SAO filter. Alternatively, the in-loop filter 145 may include the SAO filter and the adaptive loop filter. Alternatively, the in-loop filter 145 may include the deblocking filter and the adaptive loop filter.

When the in-loop filter 145 includes three filters, the in-loop filter 145 may include all of the deblocking filter, the SAO filter, and the adaptive loop filter.

The deblocking filter may alleviate a difference artefact between pixel values of blocks occurring in a boundary region of the preliminary reconstruction block $\hat{f}$ by performing filtering on the preliminary reconstruction block $\hat{f}$. A difference between pixel values of blocks may occur during a quantization process. The deblocking filter may use a predetermined filter coefficient for filtering.

The SAO filter may modify a ringing artefact or a pixel value section artefact based on an encoding block unit. The SAO filter may reconstruct, using an offset, a difference value between the pixel block f and a result of performing deblocking filtering on the preliminary reconstruction block $\hat{f}$.

The adaptive loop filter may perform filtering on a result of applying the SAO filtering on the preliminary reconstruction block $\hat{f}$ using a 1-stage linear mapping model.

The CNN-based in-loop filter 150b may generate reconstruction information by performing filtering on the prediction information. The prediction information may include a secondary preliminary reconstruction block $\hat{\hat{f}}$, and the reconstruction information may include a final reconstruction block $\tilde{f}$.

That is, the CNN-based in-loop filter 150b may be trained to generate the final reconstruction block $\tilde{f}$ based on the secondary preliminary reconstruction block $\hat{\hat{f}}$. For example, the CNN-based in-loop filter 150b may be trained to generate the final reconstruction block $\tilde{f}$ based on the secondary preliminary reconstruction block $\hat{\hat{f}}$ and the pixel block f.

The CNN-based in-loop filter 150b may transmit the final reconstruction block $\tilde{f}$ to the DPB 160.

Figure 4:
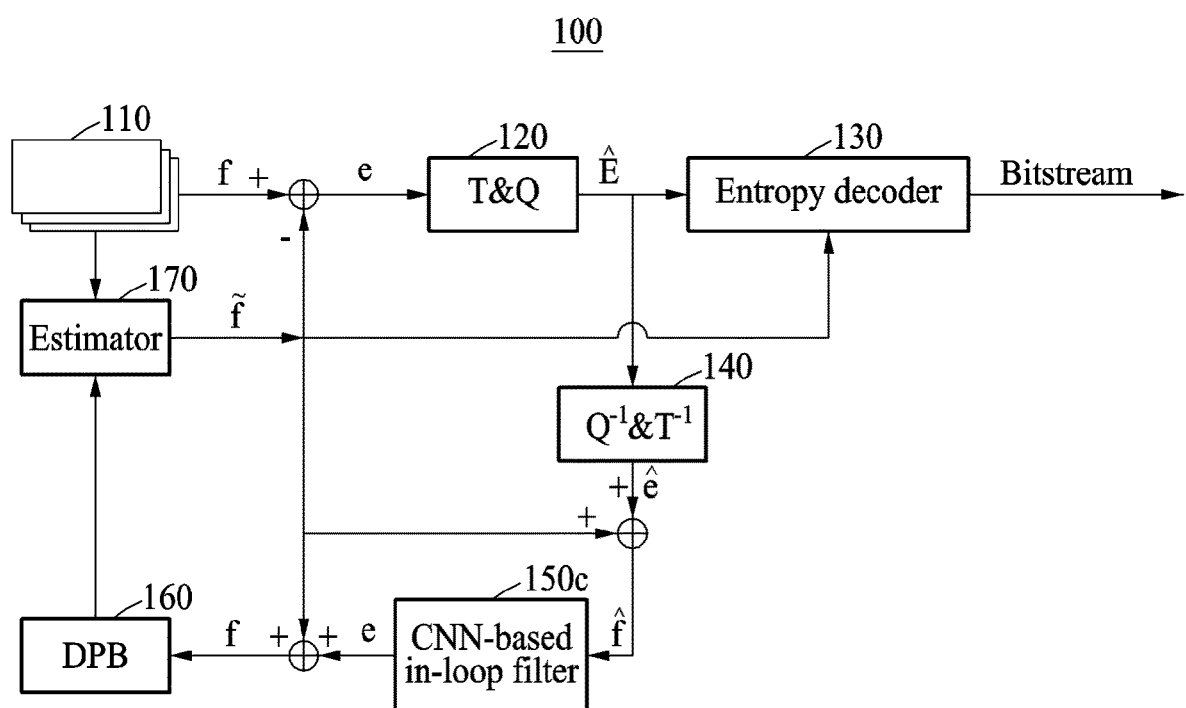
FIG. 4 is a block diagram illustrating another example of an encoding apparatus including a CNN-based in-loop filter according to an example embodiment.

FIG. 4 is a block diagram illustrating another example of an encoding apparatus including a CNN-based in-loop filter according to an example embodiment.

Referring to FIG. 4, the encoding apparatus 100 includes the transformer and quantizer 120, the entropy encoder 130, the inverse-quantizer and inverse-transformer 140, a CNN-based in-loop filter 150c, the DPB 160, the estimator 170, and the plurality of adders.

Configurations and operations of the transformer and quantizer 120, the entropy encoder 130, the inverse-quantizer and inverse-transformer 140, the DPB 160, the estimator 170, and the plurality of adders of FIG. 4 may be substantially identical to those of the transformer and quantizer 120, the entropy encoder 130, the inverse-quantizer and inverse-transformer 140, the DPB 160, the estimator 170, and the plurality of adders of FIG. 2A. In the following, the CNN-based in-loop filter 150c will be described.

The CNN-based in-loop filter 150c may generate reconstruction information by performing filtering on prediction information. The CNN-based in-loop filter 150c may receive a preliminary reconstruction block $\hat{f}$ from the adder. The CNN-based in-loop filter 150c may generate a reconstructed residual block ê by performing filtering on the preliminary reconstruction block $\hat{f}$.

That is, the CNN-based in-loop filter 150c may be trained to generate the reconstructed residual block ê based on the preliminary reconstruction block $\hat{f}$. For example, the CNN-based in-loop filter 150c may be trained to generate the reconstructed residual block ê based on the preliminary reconstruction block $\hat{f}$ and the residual block e.

The CNN-based in-loop filter 150c may transmit the reconstructed residual block ê to the adder.

The adder may generate the reconstruction block $\hat{f}$ by adding the reconstructed residual block ê and a prediction block $\bar{f}$. The adder may transmit the reconstruction block $\hat{f}$ to the DPB 160.

Figure 5:
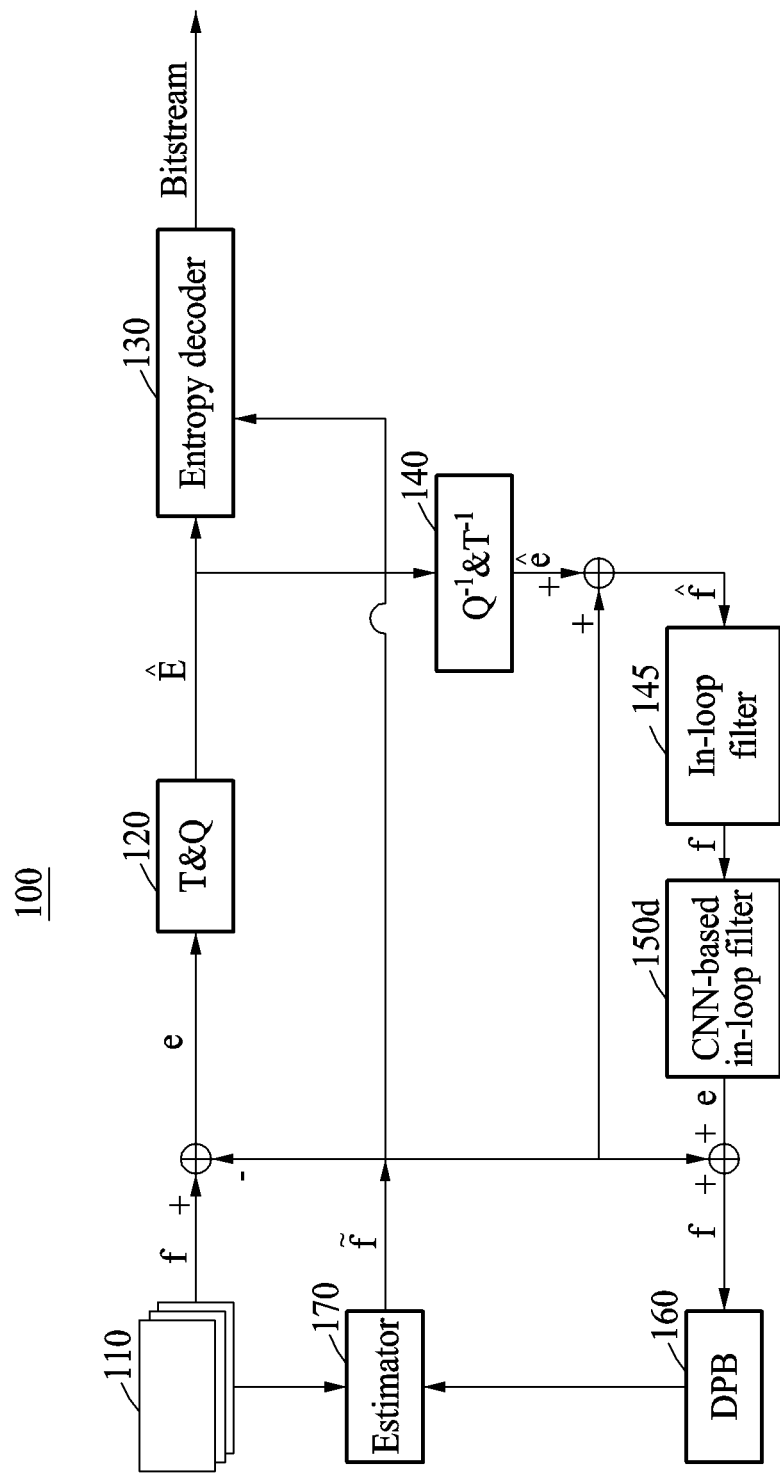
FIG. 5 is a block diagram illustrating another example of an encoding apparatus including a CNN-based in-loop filter according to an example embodiment.

FIG. 5 is a block diagram illustrating another example of an encoding apparatus including a CNN-based in-loop filter according to an example embodiment.

Referring to FIG. 5, the encoding apparatus 100 includes the transformer and quantizer 120, the entropy encoder 130, the inverse-quantizer and inverse-transformer 140, the in-loop filter 145, a CNN-based in-loop filter 150d, the DPB 160, the estimator 170, and the plurality of adders.

Configurations and operations of the transformer and quantizer 120, the entropy encoder 130, the inverse-quantizer and inverse-transformer 140, the in-loop filter 145, the DPB 160, the estimator 170, and the plurality of adders of FIG. 5 may be substantially identical to those of the transformer and quantizer 120, the entropy encoder 130, the inverse-quantizer and inverse-transformer 140, the in-loop filter 145, the DPB 160, the estimator 170, and the plurality of adders of FIG. 3. In the following, the CNN-based in-loop filter 150d will be described.

The CNN-based in-loop filter 150d may generate reconstruction information by performing in-loop filtering on prediction information. The CNN-based in-loop filter 150d may receive a secondary preliminary reconstruction block $\hat{\hat{f}}$ from the in-loop filter 145. The CNN-based in-loop filter 150d may generate a reconstructed residual block $\tilde{e}$ by performing filtering on the secondary preliminary reconstruction block $\hat{\hat{f}}$. The reconstructed residual block $\tilde{e}$ may have a value closer to zero compared to the reconstructed residual block e of FIG. 4.

That is, the CNN-based in-loop filter 150d may be trained to generate the reconstructed residual block $\tilde{e}$ based on the secondary preliminary reconstruction block $\hat{\hat{f}}$. For example, the CNN-based in-loop filter 150d may be trained to generate the reconstructed residual block $\tilde{e}$ based on the secondary preliminary reconstruction block $\hat{\hat{f}}$ and the residual block e.

The CNN-based in-loop filter 150d may transmit the reconstructed residual block $\tilde{e}$ to the adder.

The adder may generate a final reconstruction block $\tilde{f}$ by adding the reconstructed residual block $\tilde{e}$ and a prediction block $\hat{f}$. The adder may transmit the final reconstruction block $\tilde{f}$ to the DPB 160.

Figure 6:
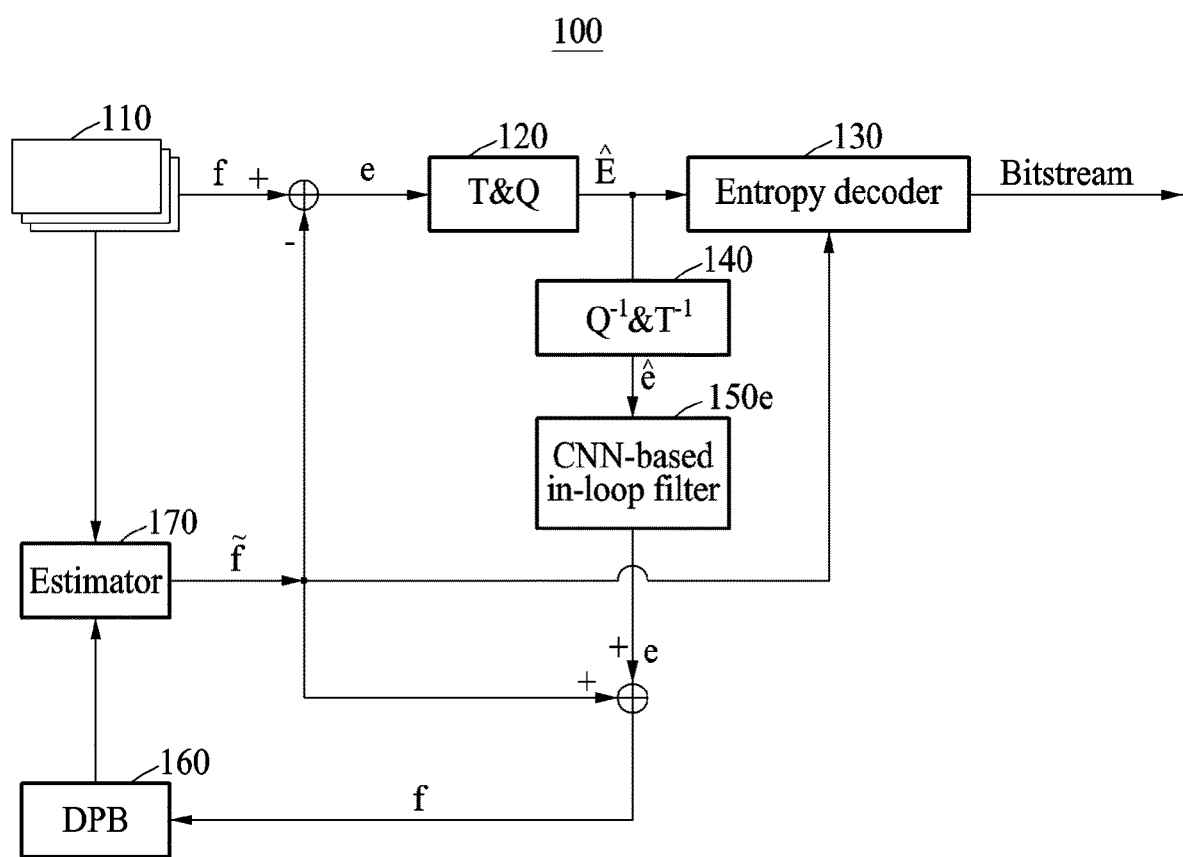
FIG. 6 is a block diagram illustrating another example of an encoding apparatus including a CNN-based in-loop filter according to an example embodiment.

FIG. 6 is a block diagram illustrating another example of an encoding apparatus including a CNN-based in-loop filter according to an example embodiment.

Referring to FIG. 6, the encoding apparatus 100 includes the transformer and quantizer 120, the entropy encoder 130, the inverse-quantizer and inverse-transformer 140, a CNN-based in-loop filter 150e, the DPB 160, the estimator 170, and the plurality of adders.

Configurations and operations of the transformer and quantizer 120, the entropy encoder 130, the inverse-quantizer and inverse-transformer 140, the DPB 160, the estimator 170, and the plurality of adders of FIG. 6 may be substantially identical to those of the transformer and quantizer 120, the entropy encoder 130, the inverse-quantizer and inverse-transformer 140, the DPB 160, the estimator 170, and the plurality of adders of FIG. 2A. In the following, the CNN-based in-loop filter 150e will be described.

The CNN-based in-loop filter 150e may generate reconstruction information by performing in-loop filtering on prediction information. The CNN-based in-loop filter 150e may receive an inversely quantized and inversely transformed reconstructed residual block ê from the inverse-quantizer and inverse-transformer 140. The CNN-based in-loop filter 150e may generate reconstruction information by performing filtering on the reconstructed residual block ê. The reconstruction information may include a secondary reconstructed residual block ê.

That is, the CNN-based in-loop filter 150e may be trained to generate the secondary reconstructed residual block ê based on the reconstructed residual block ê. For example, the CNN-based in-loop filter 150e may be trained to generate the secondary reconstructed residual block ê based on the reconstructed residual block ê and the residual block e.

The CNN-based in-loop filter 150e may transmit the reconstructed residual block ê to the adder.

The adder may generate a reconstruction block $\hat{f}$ by adding the reconstructed residual block ê and a prediction block $\hat{f}$. The adder may transmit the reconstruction block ê to the DPB 160.

Figure 7:
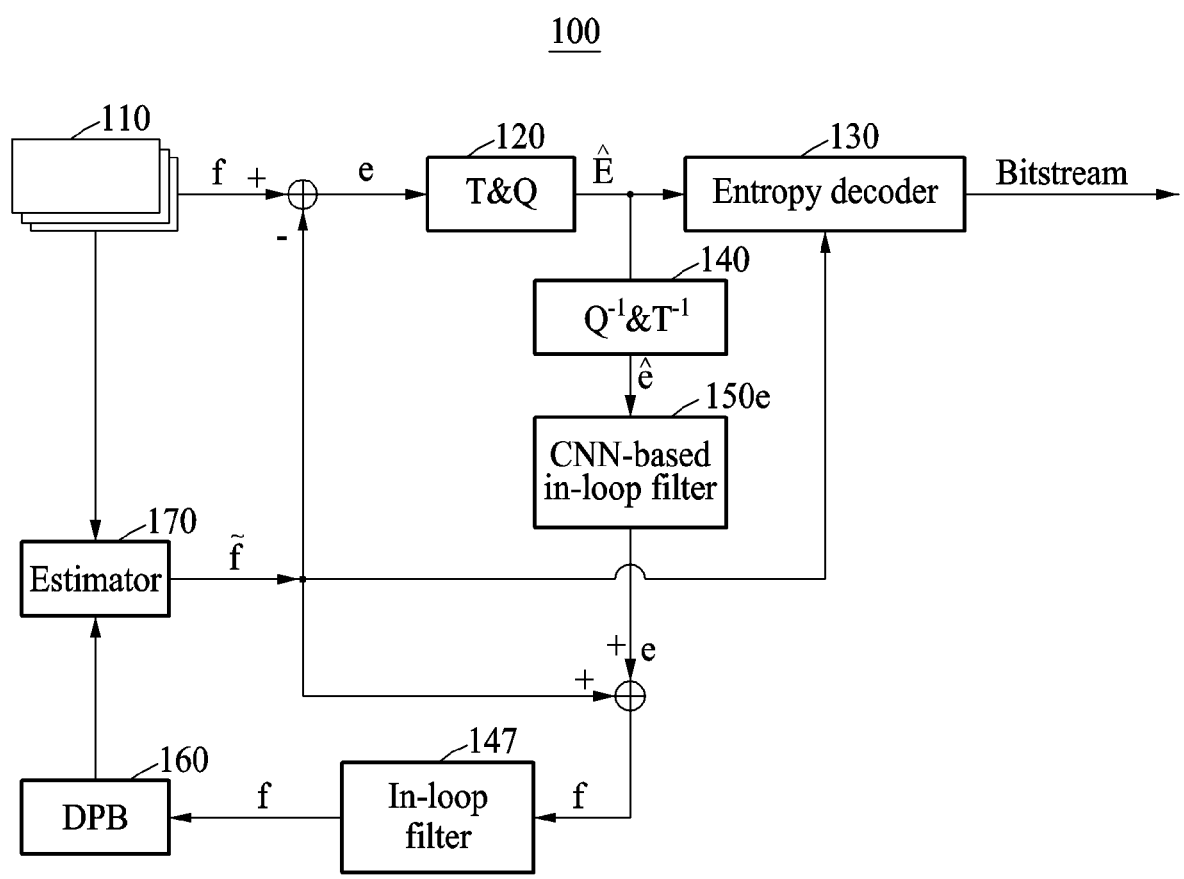
FIG. 7 is a block diagram illustrating another example of an encoding apparatus including a CNN-based in-loop filter according to an example embodiment.

FIG. 7 is a block diagram illustrating another example of an encoding apparatus including a CNN-based in-loop filter according to an example embodiment.

Referring to FIG. 7, the encoding apparatus 100 includes the transformer and quantizer 120, the entropy encoder 130, the inverse-quantizer and inverse-transformer 140, the CNN-based in-loop filter 150e, an in-loop filter 147, the DPB 160, the estimator 170, and the plurality of adders.

Configurations and operations of the transformer and quantizer 120, the entropy encoder 130, the inverse-quantizer and inverse-transformer 140, the CNN-based in-loop filter 150e, the DPB 160, the estimator 170, and the plurality of adders of FIG. 7 may be substantially identical to those of the transformer and quantizer 120, the entropy encoder 130, the inverse-quantizer and inverse-transformer 140, the CNN-based in-loop filter 150e, the DPB 160, the estimator 170, and the plurality of adders of FIG. 6. In the following, the in-loop filter 147 will be described.

The in-loop filter 147 may receive a reconstruction block ê from the adder. The reconstruction block $\hat{f}$ may be a primary reconstruction block $\hat{f}$. The in-loop filter 147 may generate a final reconstruction block $\tilde{f}$ by performing filtering on the primary reconstruction block $\hat{f}$. The in-loop filter 147 may transmit the final reconstruction block $\tilde{f}$ to the DPB 160.

As described above with reference to FIG. 3, the in-loop filter 147 may include at least one of a deblocking filter, a SAO filter, and an adaptive loop filter.

Figure 8A:
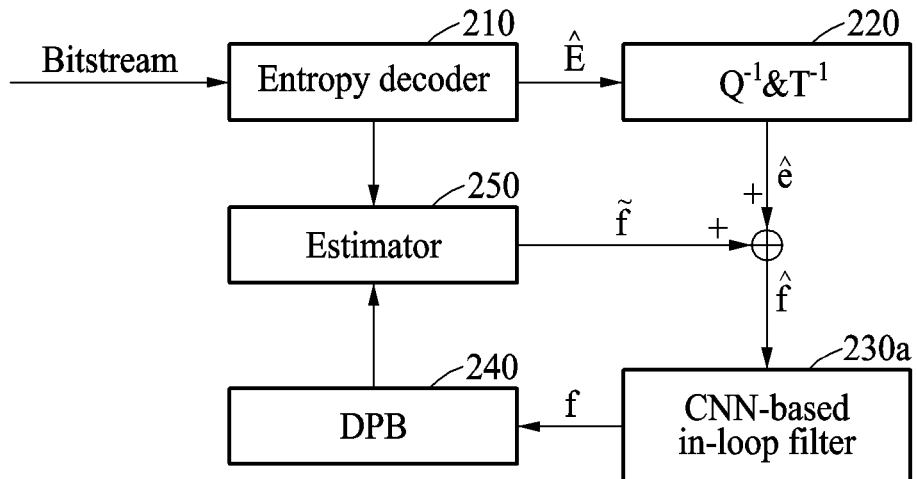
FIG. 8A is a block diagram illustrating an example of a decoding apparatus including a CNN-based in-loop filter according to an example embodiment.
Figure 8B:
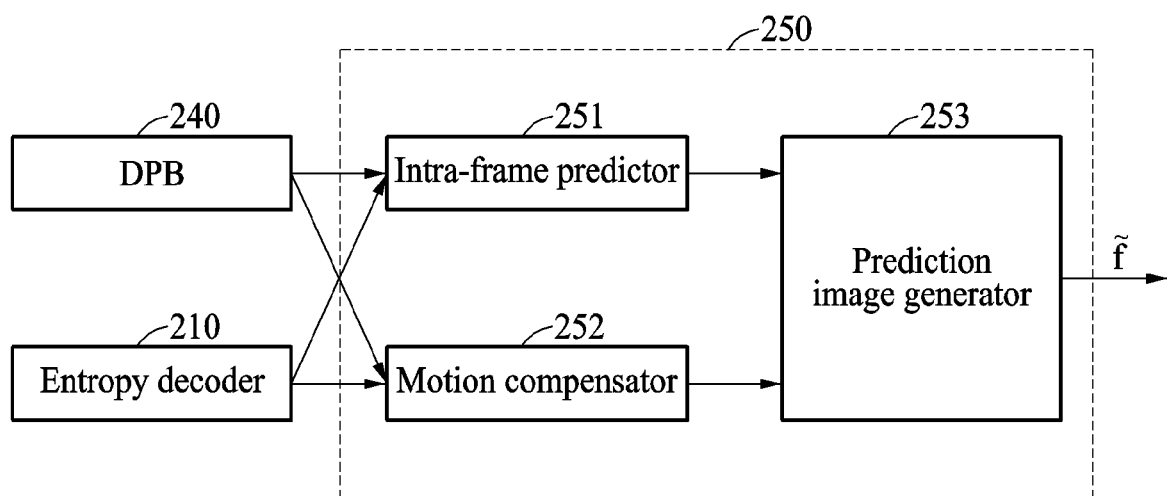
FIG. 8B is a block diagram illustrating an example of an estimator of FIG. 8A.

FIG. 8A is a block diagram illustrating an example of a decoding apparatus including a CNN-based in-loop filter according to an example embodiment, and FIG. 8B is a block diagram illustrating an example of an estimator of FIG. 8A.

Referring to FIGS. 8A and 8B, a decoding apparatus 200 includes an entropy decoder 210, an inverse-quantizer and inverse-transformer 220, a CNN-based in-loop filter 230a, an encoded picture buffer (EPB) 240, an estimator 250, and an adder.

The decoding apparatus 200 may correspond to a computing apparatus that applies, to decoding, an encoding method performed by the encoding apparatus 100 of FIGS. 2A to 7. That is, the entropy decoder 210, the inverse-quantizer and inverse-transformer 220, the EPB 240, the estimator 250, and the adder may correspond to the entropy encoder 130, the inverse-quantizer and inverse-transformer 140, the transformer and quantizer 120, the DPB 160, the estimator 170, and the adder of FIG. 2A, respectively.

The entropy decoder 210 may perform decoding by parsing encoded bitstream information. The entropy decoder 210 may perform decoding and may output filtering information and preliminary prediction information. The entropy decoder 210 may transmit a quantized residual $\hat{E}$ to the inverse-quantizer and inverse-transformer 140 and/or the estimator 170.

The inverse-quantizer and inverse-transformer 220 may generate a reconstructed residual block ê by performing inverse-quantization and/or inverse-transformation on the transformed and/or quantized residual $\hat{E}$. The inverse-quantizer and inverse-transformer 220 may transmit the reconstructed residual block ê to the adder.

The adder may receive the reconstructed residual block ê from the inverse-quantizer and inverse-transformer 220 and may receive a prediction block f̄ from the estimator 170. The adder may generate a preliminary reconstruction block f̂ by adding the reconstructed residual block ê and the prediction block f̄. The adder may transmit the preliminary reconstruction block f̂ to the CNN-based in-loop filter 230a.

The CNN-based in-loop filter 230a may generate reconstruction information by performing in-loop filtering on the prediction information. The prediction information may include the preliminary reconstruction block f̂, and the reconstruction information may include the reconstruction block f̂.

As described above with reference to FIG. 2A, the CNN-based in-loop filter 230a may use a DCNN. That is, the CNN-based in-loop filter 230a may be trained based on a plurality of pieces of training data. The CNN-based in-loop filter 230a may be trained to generate an output image appropriate for an input image.

That is, the CNN-based in-loop filter 230a may include an input layer, a hidden layer, and an output layer. Each of the input layer, the hidden layer, and the output layer may include a plurality of nodes.

The CNN-based in-loop filter 230a may perform filtering on a secondary prediction block f̄ for each slice, for each encoding block, or for each designated region. Accordingly, the decoding apparatus 200 may enhance a decoding efficiency and complexity by decoding the reconstruction block f̂ that is generated as a filtering result.

The CNN-based in-loop filter 230a may generate the reconstruction block f̂ by performing filtering on the preliminary reconstruction block f̂. That is, the CNN-based in-loop filter 230a may be trained to generate the reconstruction block f̂ based on the preliminary reconstruction block f̂. For example, the CNN-based in-loop filter 230a may be trained to generate the reconstruction block f̂ based on the preliminary reconstruction block f̂ and the and pixel block f.

The CNN-based in-loop filter 230a may transmit the reconstruction block f̂ to the EPB 240.

A configuration and a training method of the CNN-based in-loop filter 230a will be described with reference to the accompanying drawings.

The EPB 240 may store the reconstruction block f̂ or may output and display the reconstruction block f̂ using a display device.

When the EPB 240 stores the reconstruction block f̂, the EPB 240 may transmit the reconstruction block f̂ to be used for the estimator 250 to generate the prediction block f̄. For example, the estimator 250 may generate the prediction block f̄ using the reconstruction block f̂ during a subsequent intra prediction or inter prediction process.

The estimator 250 may generate the prediction block f̄ based on the reconstruction block f̂. The estimator 250 may include an intra-frame predictor 251, a motion compensator 252, and a prediction image generator 253.

The intra-frame predictor 251 and the motion compensator 252 may receive the reconstruction block f̂ from the EPB 240 and may receive the quantized residual Ê from the entropy decoder 210.

The intra-frame predictor 251 may perform an intra prediction based on the quantized residual Ê and the reconstruction block f̂ in an intra mode, and may transmit a result value to the prediction image generator 253.

The motion compensator 252 may compensate for an intra motion based on the quantized residual Ê and motion vectors of the reconstruction block f̂ and may transmit a result value to the prediction image generator 253.

The prediction image generator 253 may generate the prediction block f̄ based on the result values of the intra-frame predictor 251 and the motion compensator 252. The prediction image generator 253 may transmit the generated prediction block f̄ to the adder.

Figure 9:
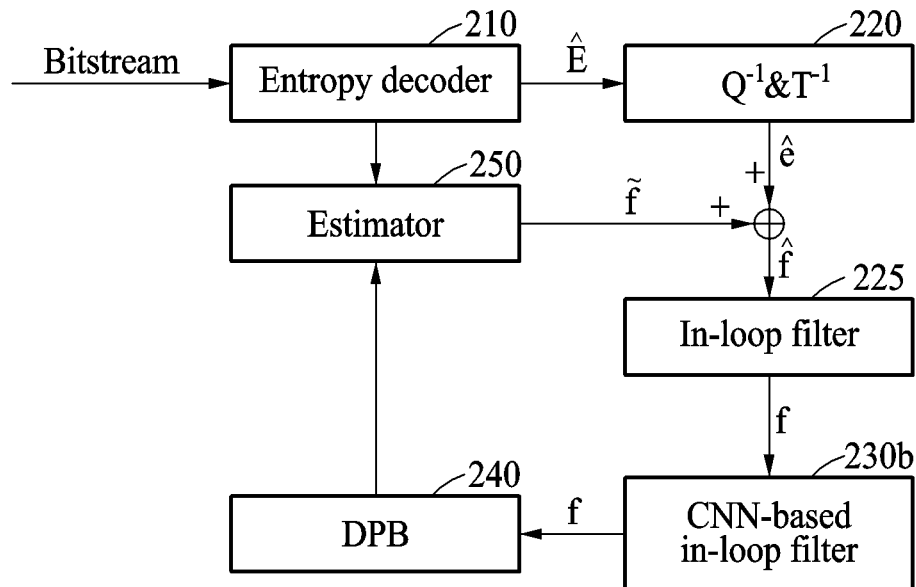
FIG. 9 is a block diagram illustrating another example of a decoding apparatus including a CNN-based in-loop filter according to an example embodiment.

FIG. 9 is a block diagram illustrating another example of a decoding apparatus including a CNN-based in-loop filter according to an example embodiment.

Referring to FIG. 9, the decoding apparatus 200 includes the entropy decoder 210, the inverse-quantizer and inverse-transformer 220, an in-loop filter 225, a CNN-based in-loop filter 230b, the EPB 240, the estimator 250, and the adder.

Configurations and operations of the entropy decoder 210, the inverse-quantizer and inverse-transformer 220, the EPB 240, the estimator 250, and the adder of FIG. 9 may be identical to those of the entropy decoder 210, the inverse-quantizer and inverse-transformer 220, the EPB 240, the estimator 250, and the adder of FIG. 8A. In the following, the in-loop filter 225 and the CNN-based in-loop filter 230b will be described.

The in-loop filter 225 may receive a preliminary reconstruction block f̂ from the adder. The in-loop filter 225 may generate a secondary preliminary reconstruction block f̄ by performing filtering on the preliminary reconstruction block f̂. The in-loop filter 225 may transmit the secondary preliminary reconstruction block f̄ to the CNN-based in-loop filter 230b.

As described above, the in-loop filter 225 may include at least one of a deblocking filter, a SAO filter, and an adaptive loop filter.

The CNN-based in-loop filter 230b may generate reconstruction information by performing in-loop filtering on prediction information. The prediction information may include the secondary preliminary reconstruction block f̄ and the reconstruction information may include a final reconstruction block f̃.

That is, the CNN-based in-loop filter 230b may be trained to generate the final reconstruction block f̃ based on the secondary preliminary reconstruction block f̄. For example, the CNN-based in-loop filter 230b may be trained to generate the final reconstruction block f̃ based on the secondary preliminary reconstruction block f̄ and the pixel block f.

The CNN-based in-loop filter 230b may transmit the final reconstruction block f̃ to the EPB 240.

Figure 10:
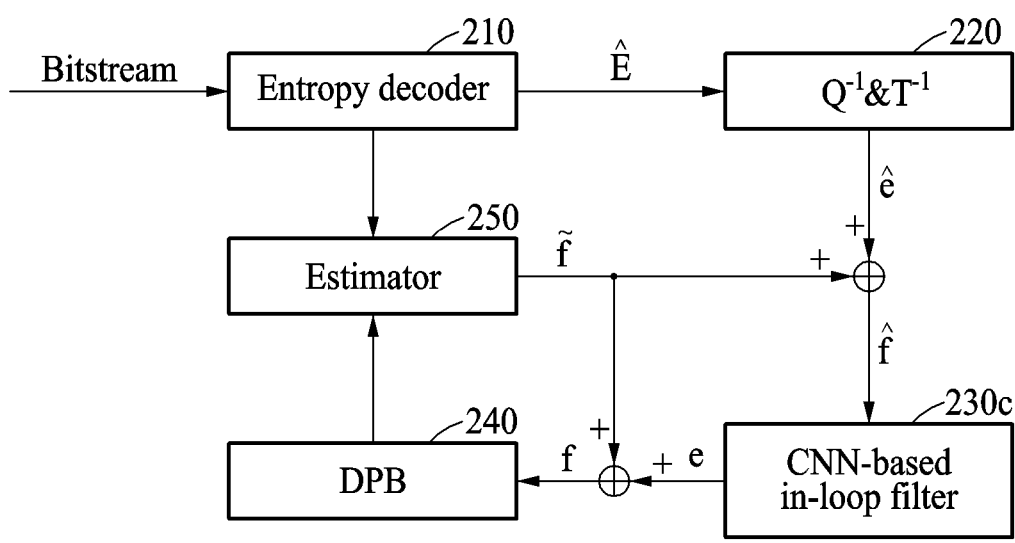
FIG. 10 is a block diagram illustrating another example of a decoding apparatus including a CNN-based in-loop filter according to an example embodiment.

FIG. 10 is a block diagram illustrating another example of a decoding apparatus including a CNN-based in-loop filter according to an example embodiment.

Referring to FIG. 10, the decoding apparatus 200 includes the entropy decoder 210, the inverse-quantizer and inverse-transformer 220, a CNN-based in-loop filter 230c, the EPB 240, the estimator 250, and the plurality of adders.

Configurations and operations of the entropy decoder 210, the inverse-quantizer and inverse-transformer 220, the EPB 240, the estimator 250, and the plurality of adders of FIG. 10 may be substantially identical to those of the entropy decoder 210, the inverse-quantizer and inverse-transformer 220, the EPB 240, the estimator 250, and the adder of FIG. 8A. In the following, the CNN-based in-loop filter 230c will be described.

The CNN-based in-loop filter 230c may generate reconstruction information by performing in-loop filtering on prediction information. The prediction information may include a preliminary reconstruction block f̂, and the reconstruction information may include a reconstructed residual block ê. The CNN-based in-loop filter 230c may receive the preliminary reconstruction block f̂ from the adder. The CNN-based in-loop filter 230c may generate the reconstructed residual block ê by performing filtering on the preliminary reconstruction block f̂.

That is, the CNN-based in-loop filter 230c may be trained to generate the reconstructed residual block e based on the preliminary reconstruction block f̂. For example, the CNN-based in-loop filter 230c may be trained to generate the reconstructed residual block ê based on the preliminary reconstruction block f̂ and the residual block e.

The CNN-based in-loop filter 230c may transmit the reconstructed residual block ê to the adder.

The adder may generate the reconstruction block f̂ by adding the reconstructed residual block ê and a prediction block f̄. The adder may transmit the reconstruction block f̂ to the EPB 240.

Figure 11:
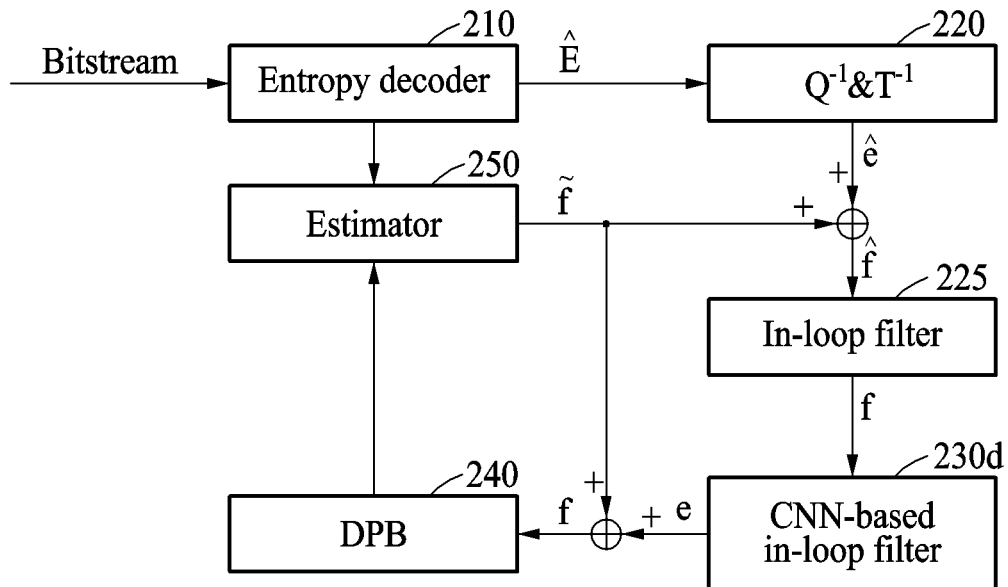
FIG. 11 is a block diagram illustrating another example of a decoding apparatus including a CNN-based in-loop filter according to an example embodiment.

FIG. 11 is a block diagram illustrating another example of a decoding apparatus including a CNN-based in-loop filter according to an example embodiment.

Referring to FIG. 11, the decoding apparatus 200 includes the entropy decoder 210, the inverse-quantizer and inverse-transformer 220, the in-loop filter 225, a CNN-based in-loop filter 230d, the EPB 240, the estimator 250, and the plurality of adders.

Configurations and operations of the entropy decoder 210, the inverse-quantizer and inverse-transformer 220, the in-loop filter 225, the CNN-based in-loop filter 230d, the EPB 240, the estimator 250, and the plurality of adders of FIG. 11 may be substantially identical to those of the entropy decoder 210, the inverse-quantizer and inverse-transformer 220, the in-loop filter 225, the EPB 240, the estimator 250, and the adder of FIG. 9. In the following, the CNN-based in-loop filter 230d will be described.

The CNN-based in-loop filter 230d may generate reconstruction information by performing in-loop filtering on prediction information. The prediction information may include a secondary preliminary reconstruction block f̂, and the reconstruction information may include a reconstructed residual block ẽ. The CNN-based in-loop filter 230d may receive the secondary preliminary reconstruction block f̂ from the in-loop filter 225. The CNN-based in-loop filter 230d may generate the reconstructed residual block ẽ by performing filtering on the secondary preliminary reconstruction block f̂. The reconstructed residual block ẽ may have a value closer to zero compared to the reconstructed residual block ê of FIG. 10.

That is, the CNN-based in-loop filter 230d may be trained to generate the reconstructed residual block ẽ based on the secondary preliminary reconstruction block f̂. For example, the CNN-based in-loop filter 230d may be trained to generate the reconstructed residual block ẽ based on the secondary preliminary reconstruction block f̂ and the residual block e.

The CNN-based in-loop filter 230d may transmit the reconstructed residual block ẽ to the adder.

The adder may generate a final reconstruction block f̃ by adding the reconstructed residual block ẽ and a prediction block f̄. The adder may transmit the final reconstruction block f̃ to the EPB 240.

Figure 12:
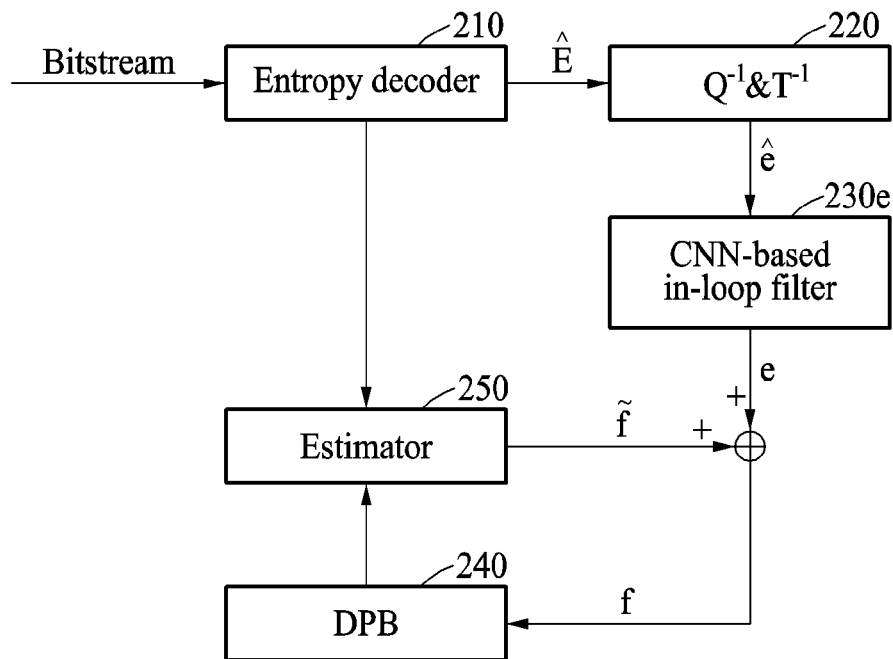
FIG. 12 is a block diagram illustrating another example of a decoding apparatus including a CNN-based in-loop filter according to an example embodiment.

FIG. 12 is a block diagram illustrating another example of a decoding apparatus including a CNN-based in-loop filter according to an example embodiment.

Referring to FIG. 12, the decoding apparatus 200 includes the entropy decoder 210, the inverse-quantizer and inverse-transformer 220, a CNN-based in-loop filter 230e, the EPB 240, the estimator 250, and the plurality of adders.

Configurations and operations of the entropy decoder 210, the inverse-quantizer and inverse-transformer 220, the EPB 240, the estimator 250, and the plurality of adders of FIG. 12 may be substantially identical to those of the entropy decoder 210, the inverse-quantizer and inverse-transformer 220, the EPB 240, the estimator 250, and the adder of FIG. 8A. In the following, the CNN-based in-loop filter 230e will be described.

The CNN-based in-loop filter 230e may generate reconstruction information by performing in-loop filtering on prediction information. The prediction information may include a prediction residual block ê, and the reconstruction information may include a secondary reconstructed residual block ê. The CNN-based in-loop filter 230e may receive an inversely quantized and inversely transformed reconstructed residual block ê from the inverse-quantizer and inverse-transformer 220. The CNN-based in-loop filter 230e may generate the secondary reconstructed residual block ê by performing filtering on the reconstructed residual block ê.

That is, the CNN-based in-loop filter 230e may be trained to generate the secondary reconstructed residual block ê based on the reconstructed residual block ê. For example, the CNN-based in-loop filter 230e may be trained to generate the secondary reconstructed residual block ê based on the reconstructed residual block ê and the residual block e.

The CNN-based in-loop filter 230e may transmit the secondary reconstructed residual block ê to the adder.

The adder may generate a reconstruction block f̂ by adding the secondary reconstructed residual block ê and a prediction block f̄. The adder may transmit the reconstruction block f̂ to the EPB 240.

Figure 13:
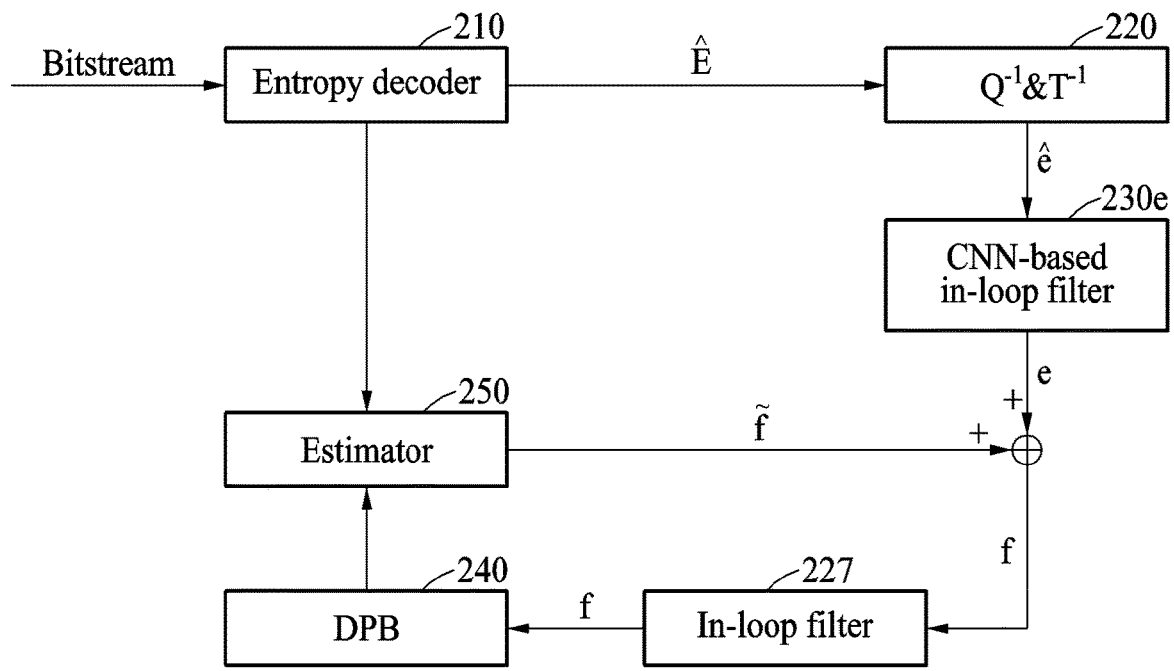
FIG. 13 is a block diagram illustrating another example of a decoding apparatus including a CNN-based in-loop filter according to an example embodiment.

FIG. 13 is a block diagram illustrating another example of a decoding apparatus including a CNN-based in-loop filter according to an example embodiment.

Referring to FIG. 13, the decoding apparatus 200 includes the entropy decoder 210, the inverse-quantizer and inverse-transformer 220, the CNN-based in-loop filter 230e, an in-loop filter 227, the EPB 240, the estimator 250, and the adder.

Configurations and operations of the entropy decoder 210, the inverse-quantizer and inverse-transformer 220, the CNN-based in-loop filter 230e, the EPB 240, the estimator 250, and the adder of FIG. 13 may be substantially identical to those of the entropy decoder 210, the inverse-quantizer and inverse-transformer 220, the CNN-based in-loop filter 230e, the EPB 240, the estimator 250, and the adder of FIG. 12. In the following, the in-loop filter 227 will be described.

The in-loop filter 227 may receive a reconstruction block f̂ from the adder. The reconstruction block f̂ may be a preliminary reconstruction block f̂. The in-loop filter 227 may generate a secondary final reconstruction block f̃ by performing filtering on the preliminary reconstruction block f̂. The in-loop filter 227 may transmit the final reconstruction block f̃ to the EPB 240.

As described above with reference to FIG. 9, the in-loop filter 227 may include at least one of a deblocking filter, a SAO filter, and an adaptive loop filter.

Figure 14:
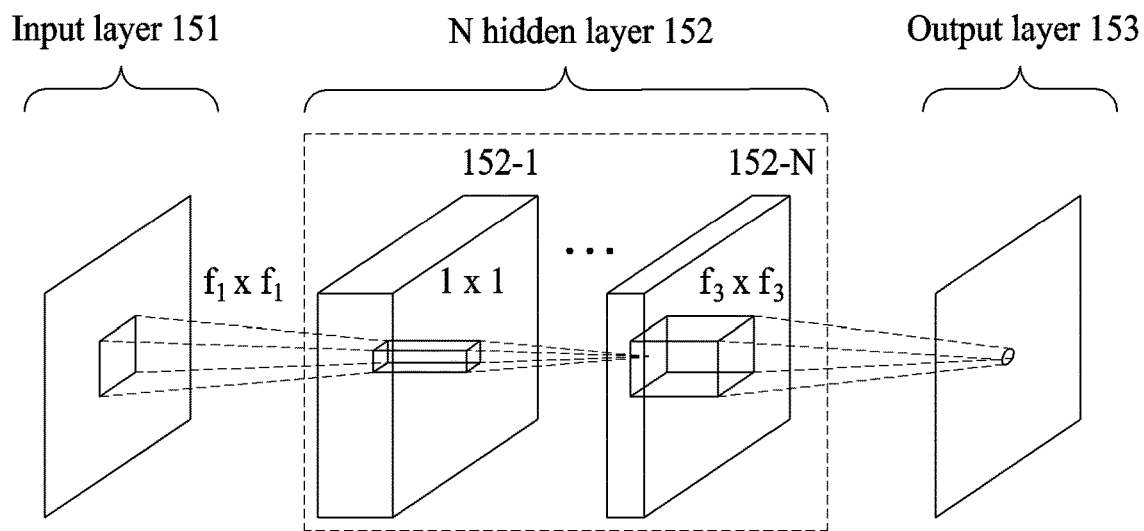
FIG. 14 illustrates an example of a structure of a CNN-based in-loop filter according to an example embodiment.

FIG. 14 illustrates an example of a structure of a CNN-based in-loop filter according to an example embodiment.

Referring to FIG. 14, a CNN-based in-loop filter 150 includes an input layer 151, a hidden layer 152, and an output layer 153.

The input layer 151 may receive an input image. The input image may include a degraded reconstruction image. For example, a reconstruction image on which inverse-quantization and inverse-transformation is performed by the inverse-quantizer and inverse-transformer 140 may be input to the input layer 151. The input image may include a block boundary artefact, a ringing artefact, and a high frequency blurring artefact. The reconstruction image may include a degradation phenomenon.

The input layer 151 may perform an image patch on the input image and may extract a plurality of image patches from the input image using the hidden layer 153. For example, the input layer 151 may perform the image patch on the input image based on a size of $(f_1 \times f_1)$.

The hidden layer 152 may perform non-linear mapping. The hidden layer 152 may include N convolutional layers. Here, the image quality may be enhanced through progress from a first convolutional layer 152-1 to an $N^{th}$ convolutional layer 152-N.

Training of the CNN-based in-loop filter 150 may be performed through the hidden layer 152, the output layer 153, and a loss function.

The first convolutional layer 152-1 may correspond to Equation 1.

$$F_1(Y) = \max(0, W_1 \cdot Y + B_1)$$

$W_1$:64(9×9)convolution filters(9×9×1×64)   [Equation 1]

A second convolutional layer may correspond to Equation 2.

$$F_2(Y) = \max(0, W_2 \cdot F_1(Y) + B_2)$$

$W_2$:64(9×9)convolution filters(9×9×64×64)   [Equation 2]

Under the same principle, the $N^{th}$ convolutional layer 152-N may correspond to Equation 3.

$$F_N(Y) \max(0, W_N \cdot F_{N-1}(Y) + B_N)$$

$W_N$:64(9×9)convolution filters(9×9×64×64)   [Equation 3]

That is, the hidden layer 152 may enhance a training efficiency and speed using a rectified linear unit (ReLU) function. The output layer 153 may correspond to Equation 4.

$$F(Y) = W_{N+1} \cdot F_N(Y) + B_{N+1}$$

$W_{N+1}$:1(9×9)convolution filters(9×9×64×1)   [Equation 4]

The output layer 153 may output an output image with the enhanced image quality through filtering. The loss function may correspond to Equation 5.

$$L(\theta) = \frac{1}{n} \sum_{i=1}^{n} \|F(Y_i; \theta) - X_i\|$$   [Equation 5]

where $\theta = \{W_1, W_2, \ldots, W_{N+1}, B_1, \ldots B_2, B_{N+1}\}$ $Y_i$: $i$-th distorted frame prior to in-loop filtering, $X_i$: $i$-th original frame $L(\theta)$: loss function (Mean Square Error)

The CNN-based in-loop filter 150 may be trained to minimize a filtering error through the loss function.

Figure 15:
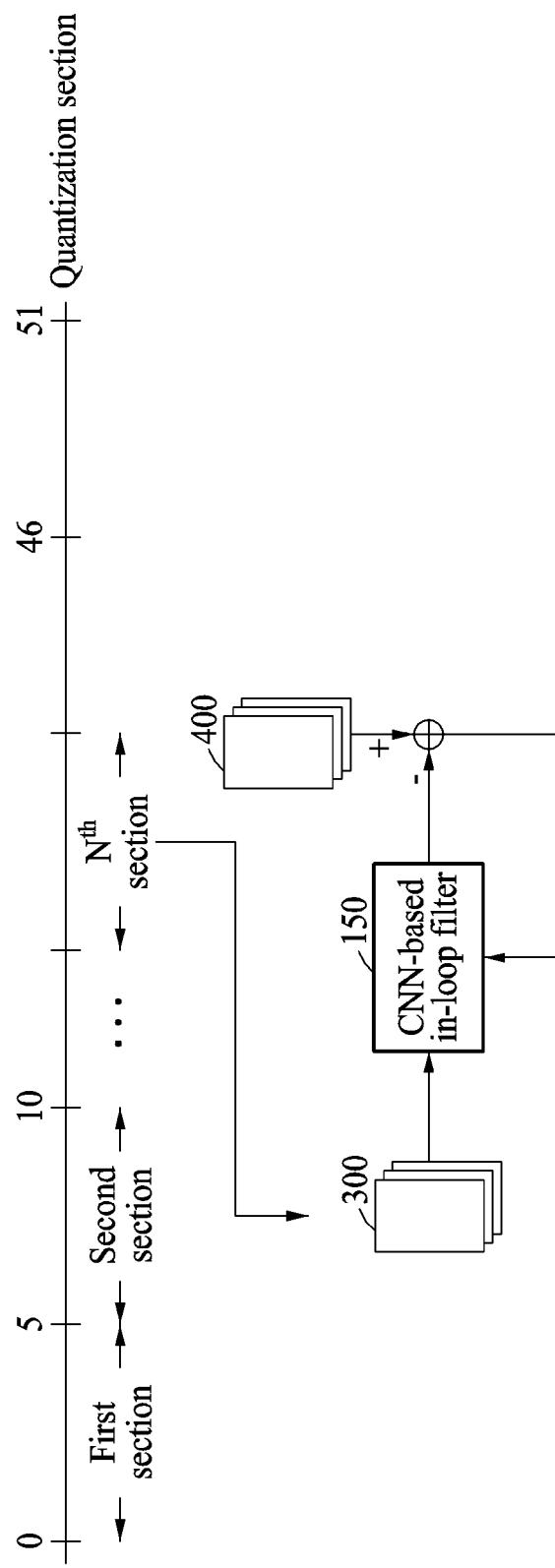
FIG. 15 illustrates an example of a section-by-section training method of a CNN-based in-loop filter according to an example embodiment.

FIG. 15 illustrates an example of a section-by-section training method of a CNN-based in-loop filter according to an example embodiment.

Referring to FIG. 15, the CNN-based in-loop filter 150 may perform training for each quantization section. The CNN-based in-loop filter 150 may process a reconstruction image having a different artefact value based on a quantization parameter. Accordingly, the CNN-based in-loop filter 150 may perform effective filtering through training for each quantization section.

The quantization parameter may have a value of greater than or equal to 0 and less than or equal to 51. Each quantization section may include at least one quantization parameter. Here, a common quantization parameter may be present between a plurality of quantization sections. For example, a first section and a second section may commonly include a quantization parameter 5.

A quantization parameter used by the encoding apparatus 100 for encoding may have a value verifiable by the decoding apparatus 200. The encoding apparatus 100 may not transmit the quantization parameter used for encoding to the decoding apparatus 200. Accordingly, the encoding apparatus 100 may enhance an encoding efficiency without causing overhead.

The encoding apparatus 100 may generate a reconstruction training image 300 using a quantization parameter of an $N^{th}$ section. The encoding apparatus 100 may transmit the reconstruction training image 300 to the CNN-based in-loop filter 150.

The CNN-based in-loop filter 150 may generate an output image by performing filtering on the reconstruction training image 300.

An adder may differentiate the output image and an original input training image, for example, an original input image 400 and may transmit the same to the CNN-based in-loop filter 150.

The CNN-based in-loop filter 150 may adjust a weight of the hidden layer 152 based on the differentiation. For example, the CNN-based in-loop filter 150 may adjust weights such that there is no difference between the output image and the input training image 400. Here, training for weight correction of the CNN-based in-loop filter 150 may use a back-propagation method.

The reconstruction training image 300 and the input training image 400 may be implemented using a plurality of example embodiments. That is, the CNN-based in-loop filter 150 may use a large number of training methods. The CNN-based in-loop filter 150 may operate differently based on a training method.

For example, the reconstruction training image 300 may include reconstructed frames prior to in-loop filtering of the in-loop filter 140. The CNN-based in-loop filter 150 may generate an output image similar to the input training image 400 by performing filtering on the reconstructed frames prior to in-loop filtering. In this case, the CNN-based in-loop filter 150 may operate as the CNN-based in-loop filter 150a of FIG. 2A.

As another example, the reconstruction training image 300 may include reconstructed frames after in-loop filtering of the in-loop filter 140. That is, the CNN-based in-loop filter 150 may generate an output image more similar to the original input training image 400 by performing filtering on the reconstructed frames after in-loop filtering. In this case, the CNN-based in-loop filter 150 may operate as the CNN-based in-loop filter 150b of FIG. 3.

As another example, the reconstruction training image 300 may be an image to which filtering of the in-loop filter 140 is applied and the input training image 400 may be a residual image e. Here, the CNN-based in-loop filter 150 may generate the reconstructed residual image by applying filtering on the image to which filtering is applied. In this case, the CNN-based in-loop filter 150 may operate as the CNN-based in-loop filter 150d of FIG. 5.

Figure 16:
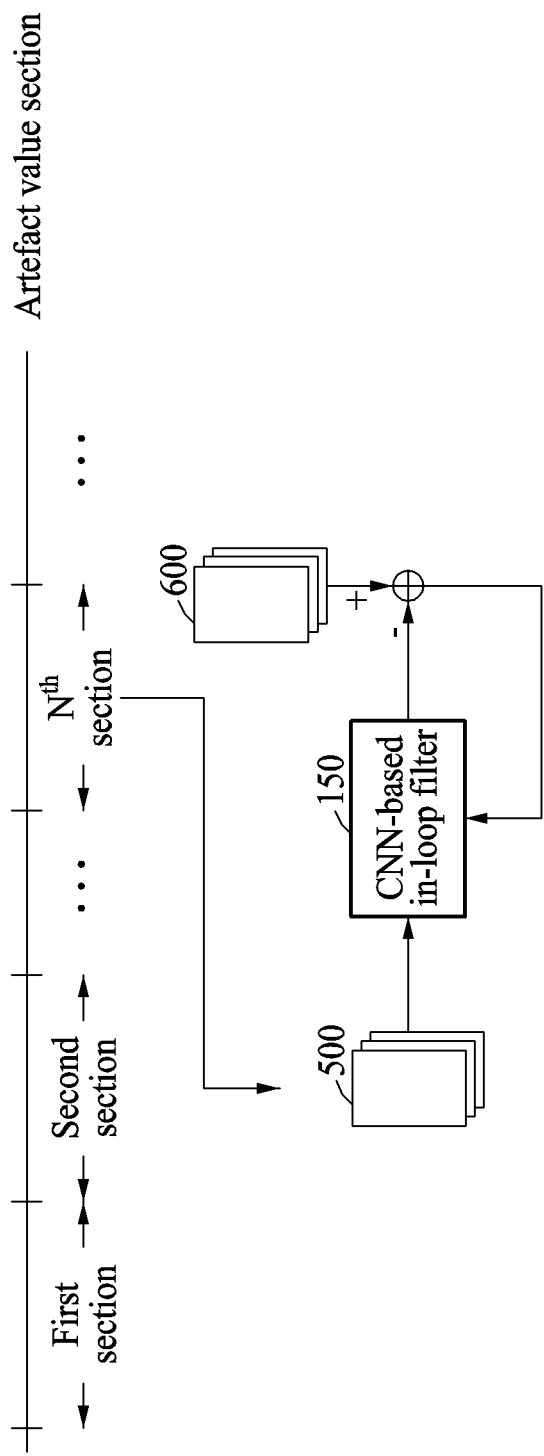
FIG. 16 illustrates another example of a section-by-section training method of a CNN-based in-loop filter according to an example embodiment.

FIG. 16 illustrates another example of a section-by-section training method of a CNN-based in-loop filter according to an example embodiment.

Referring to FIG. 16, the CNN-based in-loop filter 150 may perform training for each artefact value section. The CNN-based in-loop filter 150 may have a different artefact value based on a quantization parameter. Accordingly, the CNN-based in-loop filter 150 may perform effective filtering by performing training for each artefact value section.

An artefact value section used for encoding in the encoding apparatus 100 is a value verifiable by the decoding apparatus 200. The encoding apparatus 100 may not transmit an index used for encoding to the decoding apparatus 200. Accordingly, the encoding apparatus 100 may enhance an encoding efficiency without causing overhead.

An artefact value may be a difference between an input training image 600 and a reconstruction training image.

The encoding apparatus 100 may generate a reconstruction training image 500 belonging to an artefact value of an N-th section. The encoding apparatus 100 may transmit the reconstruction training image 500 to the CNN-based in-loop filter 150.

The CNN-based in-loop filter 150 may generate an output image by performing filtering on the reconstruction training image 500 and may transmit the output image to an adder. The adder may differentiate the output image and the original input training image 600 and may transmit the same to the CNN-based in-loop filter 150.

The CNN-based in-loop filter 150 may adjust a weight of the hidden layer 152 based on the differentiation. For example, the CNN-based in-loop filter 150 may adjust weights such that there is no difference between the output image and the input training image 600. Here, training for weight correction of the CNN-based in-loop filter 150 may use a back-propagation method.

The reconstruction training image 500 may be a reconstructed residual image. The reconstructed residual image may be an image acquired by performing transformation and quantization on a residual image and then performing inverse-quantization and inverse-transformation on the transformed and quantized image.

The input training image 600 may be a residual image. The residual image may be an image acquired by differentiating an input image and a reconstruction image. The reconstruction image may be an image to which in-loop filtering is applied or an image to which in-loop filtering is not applied.

That is, the CNN-based in-loop filter 150 may generate an output image similar to the residual image by performing filtering on the reconstructed residual image. In this case, the CNN-based in-loop filter 150 may operate as the CNN-based in-loop filter 150e of FIG. 6.

Also, the CNN-based in-loop filter 150 may perform filtering for each slice type of the image. Hereinafter, an operation of performing, by the CNN-based in-loop filter 150, filtering for each slice type is described.

Figure 17:
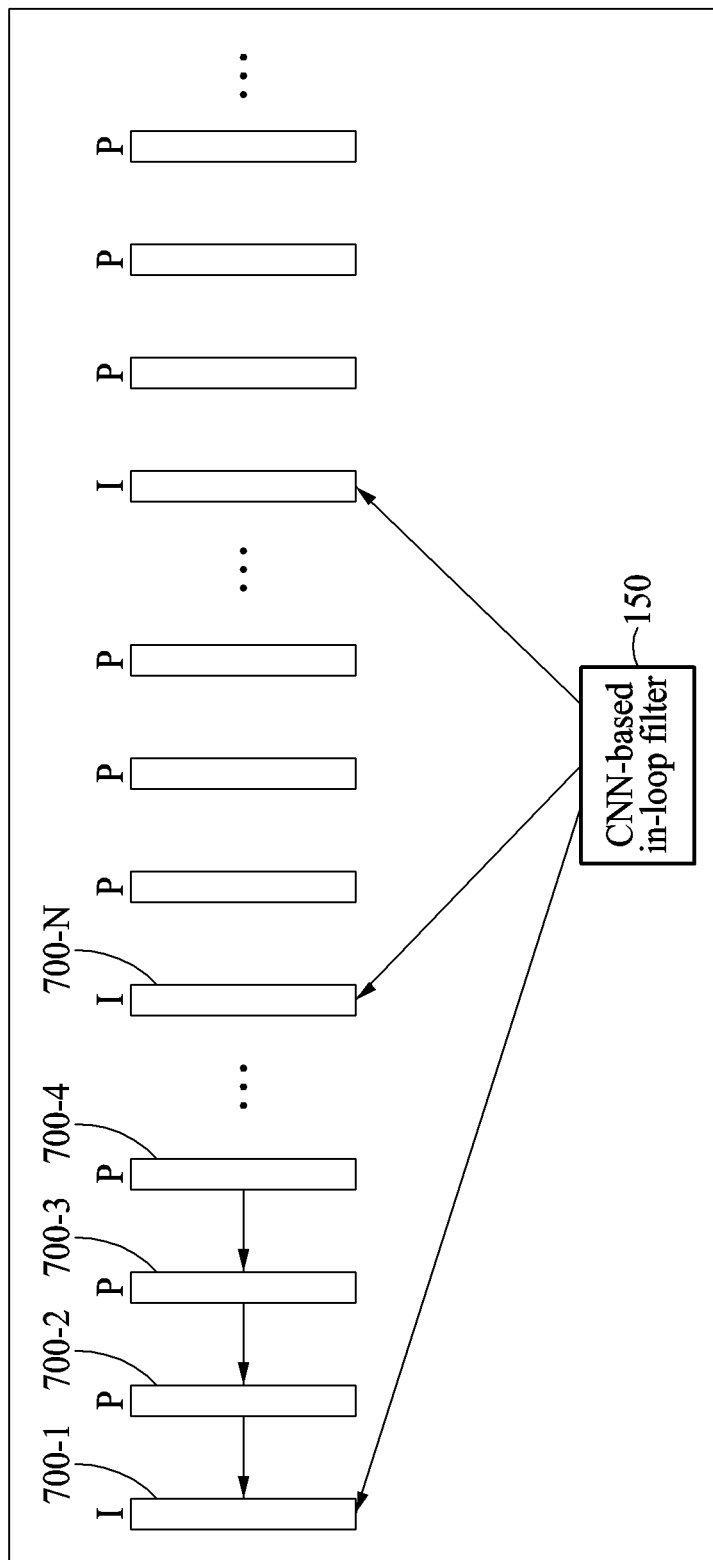
FIG. 17 illustrates an example of a training method of a CNN-based in-loop filter according to an example embodiment.

FIG. 17 illustrates an example of a training method of a CNN-based in-loop filter according to an example embodiment.

Referring to FIG. 17, the CNN-based in-loop filter 150 may perform filtering on a plurality of images during an encoding or decoding process of a low delay configuration.

A slice type of each of the plurality of images may be an intra slice (I slice) or a predictive slice (P slice).

Images 700-1 and 700-N corresponding to the intra slice may perform an intra prediction. Images 700-2, 700-3, and 700-4 corresponding to the predictive slice may perform an inter prediction.

For example, the image 700-2 of the predictive slice may predict an image by referring to the image 700-1 of the intra slice. The image 700-3 of the predictive slice may predict an image by referring to the image 700-1 of the intra slice and the image 700-2 of the predictive slice. The image 700-4 of the predictive slice may predict an image by referring to the image 700-1 of the intra slice and the images 700-2 and 700-3 corresponding to the predictive slice.

The CNN-based in-loop filter 150 may continuously provide a low artefact image by performing filtering on the images 700-1 and 700-N corresponding to the intra slice. The CNN-based in-loop filter 150 may periodically provide the images 700-1 and 700-N corresponding to the intra slice.

Figure 18:
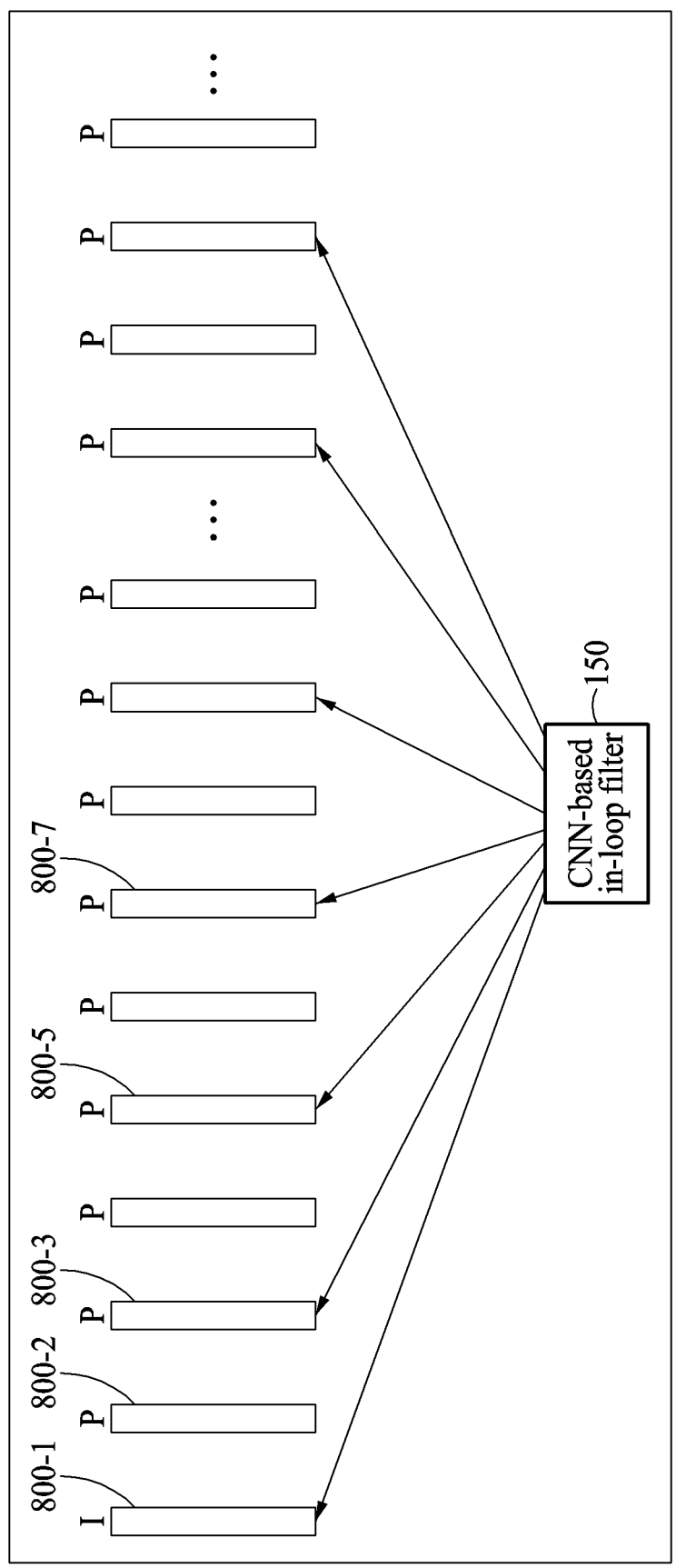
FIG. 18 illustrates another example of an applying method of a CNN-based in-loop filter according to an example embodiment.

FIG. 18 illustrates another example of an applying method of a CNN-based in-loop filter according to an example embodiment.

Referring to FIG. 18, the CNN-based in-loop filter 150 may selectively perform filtering on a plurality of images including images 800-1, 800-2, 800-3, 800-5, and 800-5 during an encoding or decoding process of a low delay configuration.

A slice type of each of the plurality of images including the images 800-1, 800-2, 800-3, 800-5, and 800-5 may be an intra slice (I slice) or a predictive slice (P slice).

The image 800-1 of the intra slice may perform an intra prediction. The images 800-2, 800-3, 800-5, and 800-7 corresponding to the predictive slice may perform an inter-prediction.

For example, the image 800-2 of the predictive slice may predict an image by referring to the image 800-1 of the intra slice. The image 800-3 of the predictive slice may predict an image by referring to the image 700-1 of the intra slice and the image 800-2 of the predictive slice. Based on the same principle, the images 800-5 and 800-7 corresponding to the predictive slice may predict an image by referring to a previous slice image.

The CNN-based in-loop filter 150 may continuously provide a low artefact image by performing filtering on the image 800-1 of the intra slice and the images 800-3, 800-5, and 800-7 corresponding to the predictive slice. The CNN-based in-loop filter 150 may provide the images 800-3, 800-5, and 800-7 corresponding to the predictive slice by periodically or selectively performing filtering.

The CNN-based in-loop filter 150 may selectively apply filtering under the low delay configuration and may also selectively apply filtering for each input slice, for each encoding unit block within an input slice, such as coding tree unit (CTU), for each encoding block, such as CU, or for each designated image region.

Figure 19:
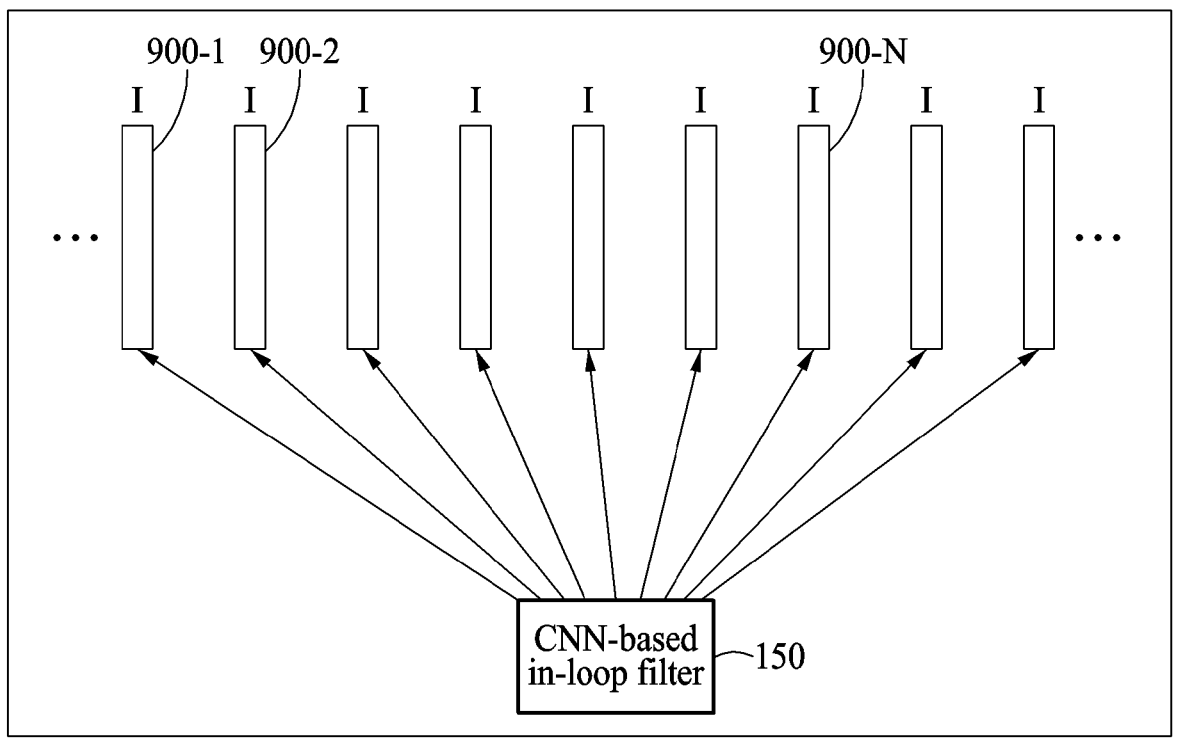
FIG. 19 illustrates another example of an applying method of a CNN-based in-loop filter according to an example embodiment.

FIG. 19 illustrates another example of an applying method of a CNN-based in-loop filter according to an example embodiment.

Referring to FIG. 19, the CNN-based in-loop filter 150 may perform filtering on a plurality of images 900-1 to 900-N during an encoding or decoding process of an all intra configuration.

A slice type of each of the plurality of images 900-1 to 900-N may be an intra slice (I slice).

The images 900-1 to 900-N corresponding to the intra slice may perform an intra prediction. That is, artefact values of the images 900-1 to 900-N corresponding to the intra slice are not transmitted to another image and the CNN-based in-loop filter 150 may provide a high quality image by performing filtering on all the images 900-1~900-N corresponding to the intra slice.

The CNN-based in-loop filter 150 may selectively perform filtering under a low delay configuration and may also selectively apply filtering for each input slice, for each encoding unit block within an input slice, such as CTU, for each encoding block, such as CU, or for each designated image region.

Figure 20:
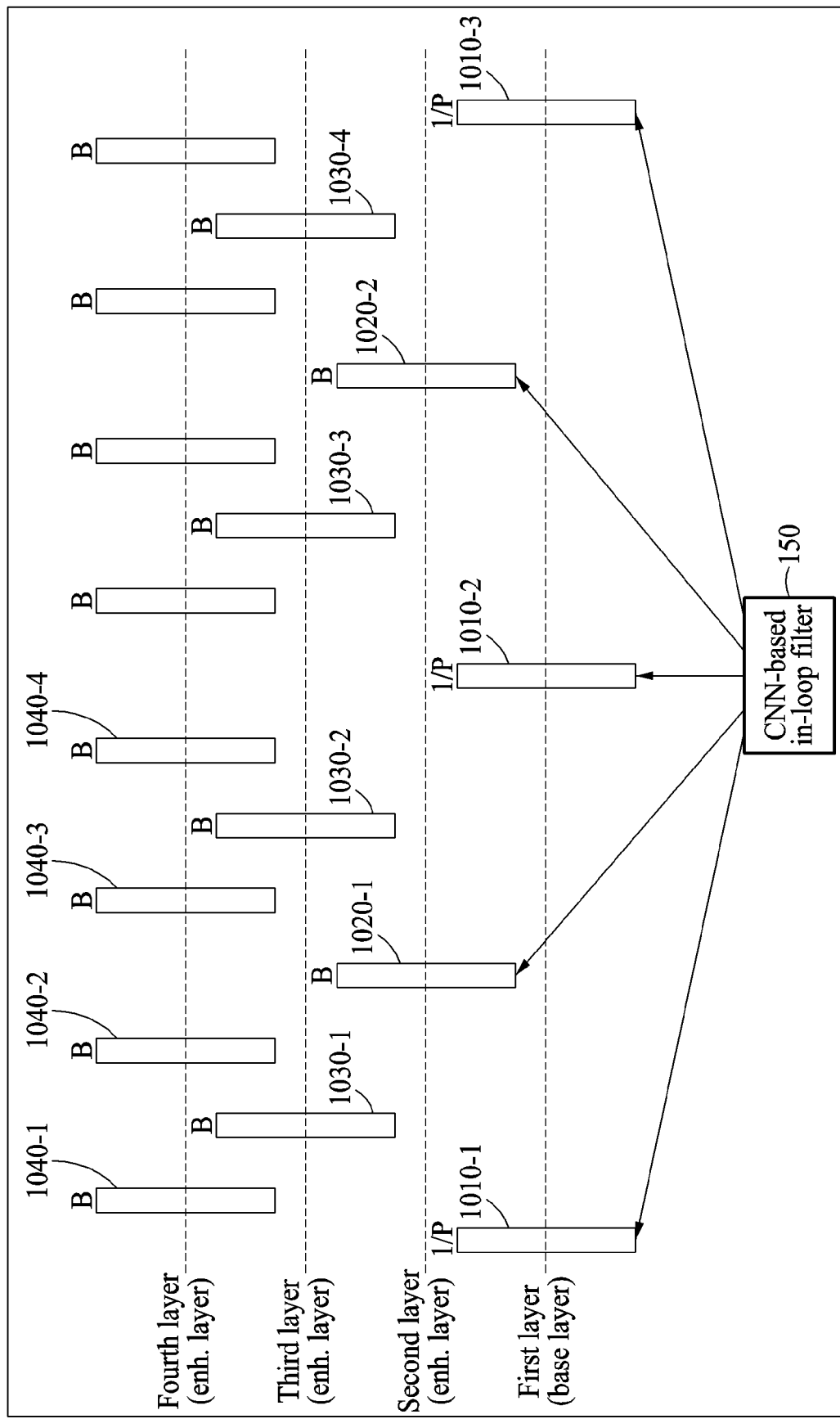
FIG. 20 illustrates another example of an applying method of a CNN-based in-loop filter according to an example embodiment.
Figure 21:
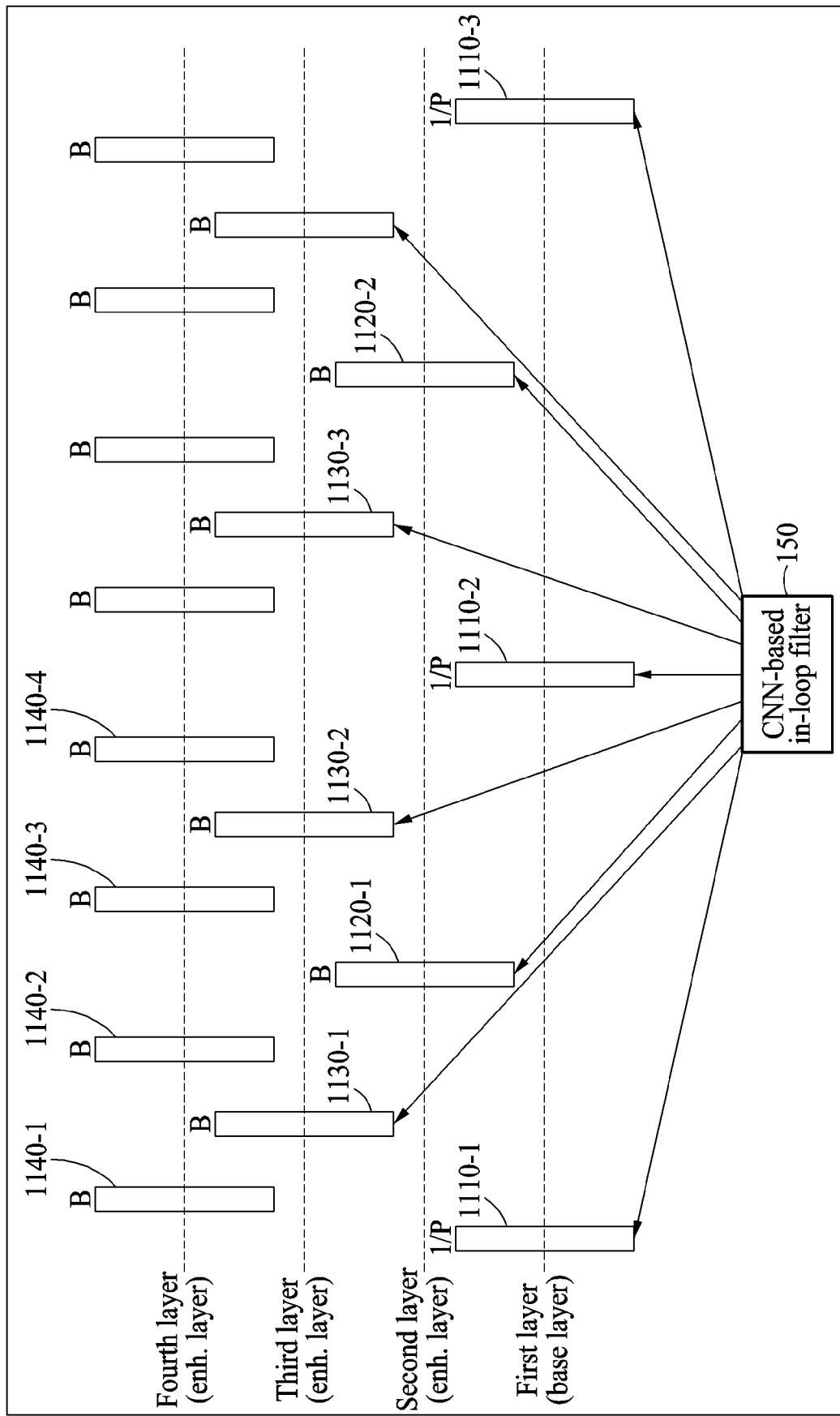
FIG. 21 illustrates another example of an applying method of a CNN-based in-loop filter according to an example embodiment.

FIG. 20 illustrates another example of an applying method of a CNN-based in-loop filter according to an example embodiment, and FIG. 21 illustrates another example of an applying method of a CNN-based in-loop filter according to an example embodiment.

Referring to FIGS. 20 and 21, the CNN-based in-loop filter 150 may perform filtering on a plurality of images including 1010-1, 1010-2, and 1010-3, 1020-1 and 1020-2, 1030-1 to 1030-4, and 1040-1 to 1040-4 during an encoding or decoding process of a hierarchical B-picture configuration.

The hierarchical B-picture configuration may include first to fourth layers.

A slice type of each of the images 1010-1, 1010-2, and 1010-3 of the first layer may be an intra slice (I slice) or a predictive slice (P slice). The images 1010-1, 1010-2, and 1010-3 may perform an intra prediction.

A slice type of each of the images including the images 1020-1 and 1020-2 of the second layer, the images 1030-1 to 1030-4 of the third image, and the images 1040-1 to 1040-4 of the fourth layers may be a bi-predictive (B) slice. The images 1020-1, 1020-2, 1030-1 to 1030-4, and 1040-1 to 1040-4 corresponding to the B slice may predict an image by referring to an image of a lower layer. Here, the images 1020-1 and 1020-2, 1030-1 to 1030-4, and 1040-1 to 1040-4 corresponding to the B slice may refer to any image regardless of whether a corresponding image is a previous image or a subsequent image. For example, the image 1020-1 of the second layer may refer to the images 1010-1 and 1010-2 of the first layer. The image 1020-2 of the second layer may refer to the images 1010-2 and 1010-3 of the first layer.

Based on the same principle, the image 1040-1 of the fourth layer may refer to the image 1010-1 of the first layer and the image 1030-1 of the third layer, and the image 1040-2 of the fourth layer may refer to the image 1020-1 of the second layer and the image 1030-2 of the third layer.

The CNN-based in-loop filter 150 may select a specific layer and may perform filtering. For example, the CNN-based in-loop filter 150 may perform filtering on the images 1010-1 to 1010-3 of the first layer.

As another example, the CNN-based in-loop filter 150 may perform filtering on the images 1010-1 to 1010-3 of the first layer and the images 1020-1 and 1020-2 of the second layer. An operation of performing, by the CNN-based in-loop filter 150, filtering on the images 1010-1 to 1010-3 of the first layer and the images 1020-1 and 1020-2 of the second layer is illustrated in FIG. 20.

As another example, the CNN-based in-loop filter 150 may perform filtering on images 1110-1 to 1110-3 of the first layer, images 1120-1 and 1120-2 of the second layer, and images 1130-1 to 1130-4 of the third layer. An operation of performing, by the CNN-based in-loop filter 150, filtering on the images 1110-1 to 1110-3 of the first layer, images 1120-1 and 1120-2 of the second layer, and the images 1130-1 to 1130-4 of the third layer is illustrated in FIG. 21.

The CNN-based in-loop filter 150 may selectively apply filtering under a low delay configuration and may also selectively apply filtering for each input slice, or for each encoding unit block within an input slice, such as CTU, for each encoding block, such as CU, or for each designated image region.

The CNN-based in-loop filter 150 may apply filtering on a specific region in an image. For example, the CNN-based in-loop filter 150 may divide the image into a plurality of regions, may select only a portion of the plurality of regions, and may apply filtering on the selected portion of the regions. Here, the CNN-based in-loop filter 150 may perform signaling regarding whether to apply filtering on the portion of the regions.

Also, the CNN-based in-loop filter 150 may apply filtering based on at least one of a texture complexity and a motion amount in the image.

The apparatuses described herein may be implemented using hardware components, software components, and/or a combination thereof. For example, the apparatuses and the components described herein may be implemented using one or more general-purpose or special purpose computers, such as, for example, a processor, a controller, an arithmetic logic unit (ALU), a digital signal processor, a microcomputer, a field programmable gate array (FPGA), a programmable logic unit (PLU), a microprocessor, or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will be appreciated that a processing device may include multiple processing elements and/or multiple types of processing elements. For example, a processing device may include multiple processors or a processor and a controller. In addition, different processing configurations are possible, such as parallel processors.

The software may include a computer program, a piece of code, an instruction, or at least one combination thereof, for independently or collectively instructing or configuring the processing device to operate as desired. Software and/or data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more computer readable storage mediums.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tapes; optical media such as CD-ROM discs, and DVDs; magneto-optical media such as floptical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

While this disclosure includes specific example embodiments, it will be apparent to one of ordinary skill in the art that various alterations and modifications in form and details may be made in these example embodiments without departing from the spirit and scope of the claims and their equivalents. For example, suitable results may be achieved if the described techniques are performed in a different order, and/or if components in a described system, architecture, device, or circuit are combined in a different manner, and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. An encoding apparatus comprising:
    a filtering unit configured to generate filtering information by filtering a residual image corresponding to a difference between an original image and a prediction image;
    an inverse filtering unit configured to generate inverse filtering information by inversely filtering the filtering information;
    an estimator configured to generate the prediction image based on the original image and reconstruction information;
    a convolutional neural network (CNN)-based in-loop filter configured to receive the inverse filtering information and the prediction image and to output the reconstruction information; and
    an encoder configured to perform encoding based on the filtering information and information of the prediction image, and
    wherein the CNN-based in-loop filter is trained for each of the plurality of artefact sections according to an artefact value or for each of the plurality of quantization parameter sections according to a quantization parameter.

2. The encoding apparatus of claim 1, wherein the filtering unit is configured to generate filtering information by transforming and quantizing the residual image, and
    the inverse filtering unit is configured to generate inverse filtering information by performing inverse quantization and inverse transformation on the filtering information.

3. The encoding apparatus of claim 1, wherein the reconstruction information is in the same format as that of the original image, and
    the CNN-based in-loop filter is configured to generate reconstruction information by inputting the inverse filtering information and prediction information based on the prediction image to the CNN-based in-loop filter.

4. The encoding apparatus of claim 3, further comprising:
    an in-loop filter configured to perform in-loop filtering on the prediction information.

5. The encoding apparatus of claim 4, wherein the in-loop filter comprises at least one of a deblocking filter, a sample adaptive offset filter, and an adaptive loop filter.

6. The encoding apparatus of claim 1, wherein the reconstruction information is in the same format as that of the residual image, and
    the CNN-based in-loop filter is configured to generate reconstruction information by inputting the inverse filtering information and prediction information based on the prediction image to the CNN-based in-loop filter.

7. The encoding apparatus of claim 6, further comprising:
    an in-loop filter configured to perform in-loop filtering on the prediction information.

8. The encoding apparatus of claim 1, further comprising:
    an in-loop filter configured to perform in-loop filtering on the reconstruction information.

9. A decoding apparatus comprising:
    an entropy decoder configured to output filtering information and preliminary prediction information by decoding encoded bitstream information;
    an inverse filtering unit configured to generate inverse filtering information by inversely filtering the filtering information;
    an estimator configured to generate a prediction image based on the preliminary prediction information; and
    a convolutional neural network (CNN)-based in-loop filter configured to receive the inverse filtering information and the prediction image and to output reconstruction information,
    wherein the CNN-based in-loop filter is trained for each of the plurality of artefact sections according to an artefact value or for each of the plurality of quantization parameter sections according to a quantization parameter.

10. The decoding apparatus of claim 9, wherein the reconstruction information is in the same format as that of the original image, and
    the CNN-based in-loop filter is configured to generate reconstruction information by inputting the inverse filtering information and prediction information based on the prediction image to the CNN-based in-loop filter.

11. The decoding apparatus of claim 10, further comprising:
    an in-loop filter configured to perform in-loop filtering on the inverse filtering information.

12. The decoding apparatus of claim 11, wherein the in-loop filter comprises at least one of a deblocking filter, a sampled adaptive offset filter, and an adaptive loop filter.

13. The decoding apparatus of claim 9, wherein the reconstruction information is in the same format as that of the residual image, and
    the CNN-based in-loop filter is configured to generate reconstruction information by inputting the inverse filtering information and prediction information based on the prediction image to the CNN-based in-loop filter.

14. The decoding apparatus of claim 13, further comprising:
    an adder configured to generate final reconstruction information by adding the reconstruction information and the prediction image.

15. The decoding apparatus of claim 13, further comprising:
    an in-loop filter configured to perform in-loop filtering on the inverse filtering information.

16. The decoding apparatus of claim 15, wherein the in-loop filter comprises at least one of a deblocking filter, a sample adaptive offset filter, and an adaptive loop filter.

17. The decoding apparatus of claim 9, wherein the reconstruction information is in the same format as that of the residual image, and the CNN-based in-loop filter is configured to generate residual reconstruction information by inputting the inverse filtering information to the CNN-based in-loop filter.

18. The decoding apparatus of claim 17, further comprising:

an adder configured to generate final reconstruction information by adding the residual reconstruction information and the prediction image.

19. The decoding apparatus of claim 18, further comprising:

an in-loop filter configured to perform in-loop filtering on the final reconstruction information.

20. The decoding apparatus of claim 19, wherein the in-loop filter comprises at least one of a deblocking filter, a sample adaptive offset filter, and an adaptive loop filter.

* * * * *